(12) United States Patent
LeDuc et al.

(10) Patent No.: US 7,591,404 B2
(45) Date of Patent: *Sep. 22, 2009

(54) SWINGABLE APPARATUS ATTACHABLE TO A VEHICLE FOR TRANSPORTING A DEVICE AND PERMITTING ACCESS TO THE VEHICLE

(75) Inventors: Ernest W. LeDuc, Valley Center, CA (US); Scott C. Salter, San Diego, CA (US); Steven J. Caliguri, Poway, CA (US)

(73) Assignee: Sunbeam Products, Inc., Boca Raton, FL (US)

( * ) Notice: Subject to any disclaimer, the term of this patent is extended or adjusted under 35 U.S.C. 154(b) by 1231 days.

This patent is subject to a terminal disclaimer.

(21) Appl. No.: 10/719,107

(22) Filed: Nov. 21, 2003

(65) Prior Publication Data

US 2004/0112369 A1    Jun. 17, 2004

Related U.S. Application Data

(63) Continuation-in-part of application No. 10/261,800, filed on Sep. 30, 2002, now Pat. No. 6,701,913.

(51) Int. Cl.
*B60R 9/06* (2006.01)
*F24C 1/16* (2006.01)
(52) U.S. Cl. .................. 224/509; 224/519; 126/276
(58) Field of Classification Search .......... 224/282, 224/488, 495, 497, 502, 509, 519, 504, 506, 224/518, 520, 521; 126/276; D12/162
See application file for complete search history.

(56) References Cited

U.S. PATENT DOCUMENTS 3,188,034 A     6/1965  Jackson
3,202,332 A     8/1965  Walker
3,228,576 A     1/1966  Gaukel
3,282,368 A    11/1966  Pittera
3,283,973 A    11/1966  Wargo
3,326,434 A     6/1967  Cheadle
3,348,259 A    10/1967  Wilhelmsen et al.
3,606,385 A     9/1971  Johannes
3,613,971 A    10/1971  Betz
3,614,136 A    10/1971  Dent
3,658,201 A     4/1972  Williams et al.
3,796,333 A     3/1974  Goldstein (Continued)

OTHER PUBLICATIONS

PCT Written Opinion, International Application No. PCT/US03/37430, mailing date Jan. 13, 2006, 7 pages, International Preliminary Examining Authority/U.S.
Freedom Grill website at http://www.freedomgrill.com, Oct. 8, 2002, 3 pages, obtained from http://www.archive.org on Mar. 30, 2006.
PCT International Search Report, International Application No. PCT/US03/37430, mailing date Jun. 7, 2005, 3 pages., International Search Authority /U.S.
PCT International Preliminary Examination Report (and notification), International App. No. PCT/US03/37430, mail date Jul. 3, 2006, 8 pages, Inter. Prelim. Authority/U.S.

(Continued)

*Primary Examiner*—Nathan J Newhouse
*Assistant Examiner*—Justin M Larson
(74) *Attorney, Agent, or Firm*—Lawrence J. Shurupoff

(57) ABSTRACT

One aspect of the invention is an apparatus that is selectively attachable to a vehicle, for transporting a device and positioning the device in an orientation that permits access to the vehicle. The apparatus may include a support arm defining a support arm longitudinal axis, wherein the support arm has a hitch collar hole. The apparatus may also include a primary swing arm defining a primary swing arm longitudinal axis. The apparatus may further include a primary hinge assembly coupled to the support arm and the primary swing arm.

53 Claims, 18 Drawing Sheets

U.S. PATENT DOCUMENTS

| | | | |
|---|---|---|---|
| 3,845,891 A | 11/1974 | Becher | |
| 3,878,585 A | 4/1975 | Morris | |
| 3,880,335 A | 4/1975 | Winkler | |
| 3,894,668 A | 7/1975 | Chapman et al. | |
| 3,902,642 A | 9/1975 | McNeece | |
| 3,912,098 A | 10/1975 | Nicotra | |
| 4,019,664 A | 4/1977 | Weiler | |
| 4,089,554 A | 5/1978 | Myers | |
| 4,125,214 A | 11/1978 | Penn | |
| 4,132,336 A | 1/1979 | Leinaar | |
| 4,189,074 A | 2/1980 | Davies | |
| 4,221,311 A | 9/1980 | Penn | |
| 4,241,858 A | 12/1980 | Lawroski | |
| 4,282,994 A | 8/1981 | Hilliard | |
| 4,291,823 A | 9/1981 | Freeman et al. | |
| 4,327,848 A | 5/1982 | Weiler | |
| 4,327,849 A | 5/1982 | Sharpton | |
| 4,345,697 A | 8/1982 | Wilson et al. | |
| 4,350,471 A | 9/1982 | Lehmann | |
| 4,394,947 A | 7/1983 | Tartaglia | |
| 4,394,948 A | 7/1983 | Graber | |
| 4,406,384 A | 9/1983 | Schantz | |
| 4,418,851 A | 12/1983 | Ankeny | |
| 4,461,410 A | 7/1984 | Tartaglia | |
| 4,465,423 A | 8/1984 | Anderson | |
| 4,483,468 A | 11/1984 | Lucas | |
| 4,561,575 A | 12/1985 | Jones | |
| 4,635,835 A | 1/1987 | Cole | |
| 4,671,439 A | 6/1987 | Groeneweg | |
| 4,674,782 A | 6/1987 | Helber | |
| 4,676,414 A | 6/1987 | Deguevara | |
| 4,744,590 A | 5/1988 | Chesney | |
| 4,771,926 A | 9/1988 | Anderson et al. | |
| 4,813,584 A | 3/1989 | Wiley | |
| 4,856,686 A * | 8/1989 | Workentine | 224/497 |
| 4,915,276 A | 4/1990 | Devito | |
| 4,938,399 A | 7/1990 | Hull et al. | |
| 4,971,237 A | 11/1990 | Davis | |
| 4,976,386 A | 12/1990 | Geiger | |
| 4,991,865 A * | 2/1991 | Francisco | 280/477 |
| 5,004,133 A | 4/1991 | Wyers | |
| 5,015,025 A | 5/1991 | Henriquez | |
| 5,018,651 A | 5/1991 | Hull et al. | |
| 5,029,740 A | 7/1991 | Cox | |
| 5,033,662 A | 7/1991 | Godin | |
| 5,038,983 A | 8/1991 | Tomososki | |
| 5,094,373 A | 3/1992 | Lovci | |
| 5,106,002 A | 4/1992 | Smith et al. | |
| 5,114,120 A | 5/1992 | Bartelt et al. | |
| 5,137,192 A | 8/1992 | Sheridan et al. | |
| 5,190,195 A | 3/1993 | Fullhart et al. | |
| 5,205,700 A | 4/1993 | Lin et al. | |
| 5,219,105 A | 6/1993 | Kravitz | |
| 5,232,133 A | 8/1993 | Speer | |
| 5,232,135 A | 8/1993 | Marren | |
| 5,244,133 A | 9/1993 | Abbott et al. | |
| 5,277,447 A * | 1/1994 | Blaser | 280/479.2 |
| 5,303,857 A | 4/1994 | Hewson | |
| 5,330,084 A | 7/1994 | Peters | |
| 5,344,175 A | 9/1994 | Speer | |
| 5,372,287 A | 12/1994 | Deguevara | |
| 5,439,151 A | 8/1995 | Clayton | |
| 5,443,189 A | 8/1995 | Hirschfeld | |
| 5,454,496 A | 10/1995 | Sumida et al. | |
| 5,469,997 A | 11/1995 | Carlson | |
| 5,518,159 A | 5/1996 | DeGuevara | |
| 5,520,315 A | 5/1996 | Graham | |
| 5,529,231 A | 6/1996 | Burgess | |
| 5,544,799 A | 8/1996 | Didlake | |
| 5,547,116 A | 8/1996 | Eckhart | |
| 5,560,525 A | 10/1996 | Grohmann et al. | |
| 5,626,126 A | 5/1997 | McNulty | |
| 5,664,717 A | 9/1997 | Joder | |
| 5,752,639 A * | 5/1998 | Rice | 224/521 |
| 5,845,832 A | 12/1998 | Eichmann | |
| 5,881,937 A | 3/1999 | Sadler | |
| 5,950,617 A | 9/1999 | Lorenz | |
| 6,024,263 A * | 2/2000 | Lewis et al. | 224/509 |
| 6,089,430 A | 7/2000 | Mehls | |
| 6,129,371 A | 10/2000 | Powell | |
| 6,237,823 B1 | 5/2001 | Stewart et al. | |
| 6,250,483 B1 * | 6/2001 | Frommer | 212/180 |
| 6,390,344 B1 * | 5/2002 | Edgerly | 224/531 |
| 6,502,845 B1 | 1/2003 | Van Vleet | |
| 6,520,473 B2 | 2/2003 | Lee | |
| 6,588,418 B1 | 7/2003 | Loving | |
| 6,701,913 B1 | 3/2004 | LeDuc et al. | |
| 6,739,269 B1 | 5/2004 | Benton | |
| 6,769,704 B2 | 8/2004 | Cipolla | |
| 7,281,646 B2 * | 10/2007 | Flannery | 224/509 |

OTHER PUBLICATIONS

RVQ website at http://www.myrvq.com/. Webpages printed on Sep. 17, 2002 as follows: 1 printed page from http://www.myrvq.com/; 1 printed page from http://www.myrvq.com/img/shishkabob.jpg; and 1 printed page from http://www.myrvq.com/img/rvqclosed.jpg.
Cook & Chill website at http://www.coolcnchill.com/shop/. 3 printed pages from website printed on Sep. 17, 2002.
Grill-N-Chill.com website at http://www.grill-n-chill.com. Webpages printed Sep. 17, 2002 as follows: 2 printed pages from http://www.grill-n-chill.com/home.htm; 1 printed page from http://www.grill-n-chill.com/images/Grill-N-Chill_by_itself.jpg; 1 printed p. from http://www.grill-n-chill.com/images/Truck_Cut_1.jpg; and 1 printed page from http://www.grill-n-chill.corn/images/stainless_truck2.jpg.
BBQ Pits by Gator Pit website at http://www.gatorpit.net/. Webpages printed on Sep. 17, 2002 as follows: 5 printed pages from http://www.gatorpit.net/1; 1 printed page from http://www.gatorpit.net/images/LM-F250_Home.jpg; and 8 printed pages from http://www.gatorpit.net/more_photos.htm.

* cited by examiner

SWINGABLE APPARATUS ATTACHABLE TO A VEHICLE FOR TRANSPORTING A DEVICE AND PERMITTING ACCESS TO THE VEHICLE

CROSS-REFERENCE TO RELATED APPLICATIONS

This application is a continuation-in-part of U.S. patent application Ser. No. 10/261,800, filed Sep. 30, 2002 now U.S. Pat. No. 6,701,913, titled "Swingable apparatus attachable to a vehicle for transporting a cooking device and permitting access to the vehicle", which is incorporated herein by this reference.

BACKGROUND

1. Technical Field

The present invention relates to apparatuses for attaching a device to a vehicle. More particularly, the invention concerns an apparatus that is selectively attachable to a vehicle, for transporting a device (for example a cooking device), and positioning the device in an orientation that permits access to the vehicle (for example, while cooking).

2. Description of Related Art

Outdoor leisure and recreational activities such as camping, fishing, picnicking at the beach or a park, cookouts, road trips, and tailgate parties at sporting events have become increasingly popular. Often, people are transported to these types of outdoor activities in a vehicle such as a truck, pickup truck, sport utility vehicle, or recreational vehicle. Frequently, people partaking in these mobile outdoor activities desire a freshly cooked hot meal.

One way of cooking a hot meal is to build a campfire and cook the meal over the fire. However, building a campfire can require a lot of effort, and creates a risk of fires. Also, campfires are not permitted in many areas. Hot meals can also be cooked on a public barbeque at a campground or picnic area. However, public barbeques are frequently dirty, are in a state of disrepair, or are not available.

Another way of cooking a hot meal is to bring a barbeque in the vehicle, set it up at the camping, picnicking, or tailgating site, and cook the meal on the barbeque. However, transporting the barbeque in the vehicle uses valuable space inside the vehicle, and further, the barbeque cannot be put back into the vehicle until it cools down after cooking.

Another approach has been to permanently attach a barbeque to the exterior of a vehicle. However, it is often undesirable to always have a barbeque attached to the exterior of the vehicle. For example, there is a risk of theft, the barbeque is exposed to the elements for a long period of time, and parking can be problematic.

Yet another approach is to attach a barbeque to a trailer hitch on the rear of the vehicle. Although this has the advantage of permitting removal of the barbeque from the vehicle, this approach has the disadvantage of blocking access to the rear doors or hatch of the vehicle when the barbeque is attached. In summary, all of the known ways of cooking a hot meal when partaking in mobile outdoor activities have proven inadequate.

Additionally, known ways of transporting items other than cooking devices also often block access to the rear doors or hatch of the vehicle. Furthermore, known apparatuses that attach to the rear of a vehicle for transporting items, often do not permit simultaneous use of a trailer ball hitch, thereby preventing the user from towing an object, such as a boat or trailer, while using the apparatus.

SUMMARY

An example of one aspect of the invention is an apparatus that is selectively attachable to a vehicle, for transporting a device and positioning the device in an orientation that permits access to the vehicle. The apparatus may include a support arm defining a support arm longitudinal axis, wherein the support arm has a hitch collar hole. The apparatus may also include a primary swing arm defining a primary swing arm longitudinal axis. The apparatus may further include a primary hinge assembly coupled to the support arm and the primary swing arm. This example and other examples of the invention are described in the sections below.

Examples of the invention may provide one or more of the following advantages. Some examples of the apparatus of the invention permit swinging a device (such as a cooking device, bicycle, skis, luggage, wheelchair, container, or tank) further behind the vehicle, or to the side of the vehicle, to permit complete accessibility to the vehicle cargo bay via the rear door(s) or the rear hatch of the vehicle, when loading or unloading the vehicle. Additionally, some examples of the apparatus can easily be attached and unattached from the vehicle. Also, some examples of the apparatus permit easily adjusting the distance of portions of the apparatus from the vehicle. Further, some examples of the apparatus permit utilizing a trailer ball hitch while using the apparatus. The invention also provides a number of other advantages and benefits, which should be apparent from the following description.

DETAILED DESCRIPTION

The nature, objectives, and advantages of the invention will become more apparent to those skilled in the art after considering the following detailed description in connection with the accompanying drawings. Herein "attached" means directly or indirectly connected.

I. Hardware Components and Interconnections

A. First Examples

Figure 1:
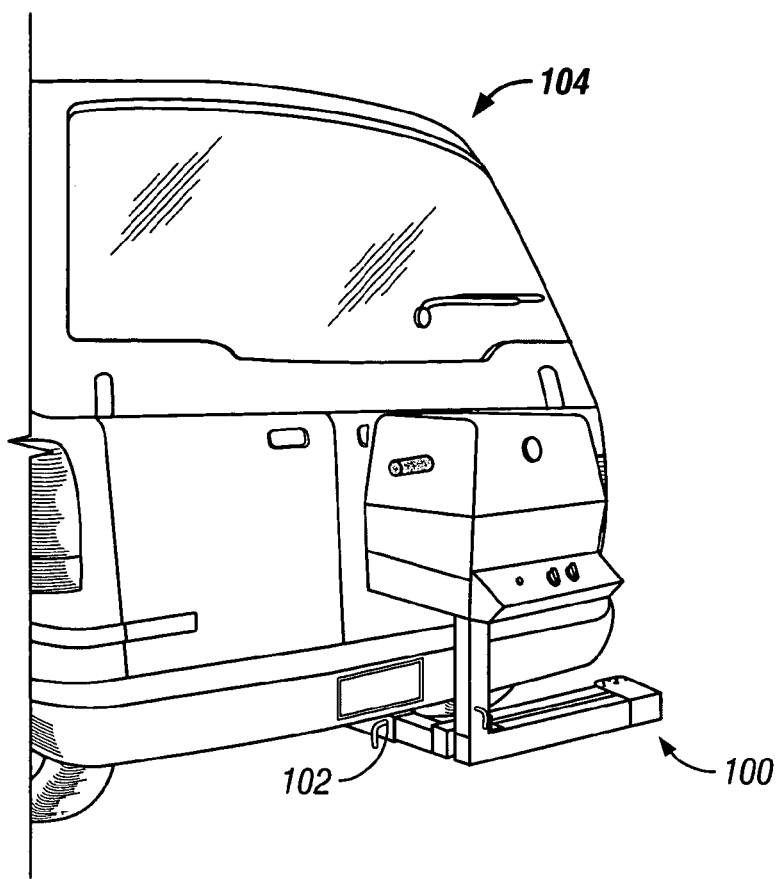
FIG. 1 is a perspective view of an example of an apparatus in accordance with an illustrative embodiment of the invention, in its operative environment.
Figure 2:
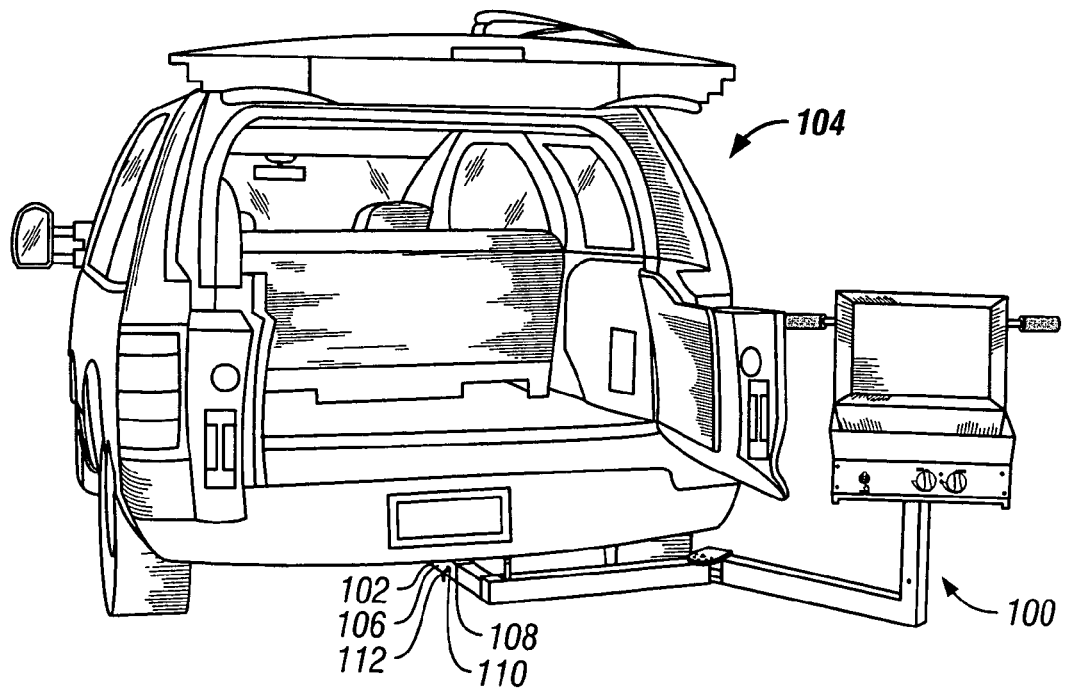
FIG. 2 is a perspective view of an example of an apparatus in accordance with an illustrative embodiment of the invention, in its operative environment.

One aspect of the invention is an apparatus that is selectively attachable to a vehicle, for transporting a cooking device, and positioning the cooking device in an orientation for cooking that permits access to the vehicle. As an example the invention may be embodied by the apparatus 100 shown in its operative environment in FIG. 1. In FIG. 1 the apparatus 100 is attached to the trailer hitch 102 of a vehicle 104, with the apparatus 100 oriented for transport, and with the rear door and hatch of the vehicle 104 closed. The apparatus 100 is also shown in its operative environment in FIG. 2, attached to the trailer hitch 102 of the vehicle 104, with the apparatus 100 oriented for cooking, and with the rear door and hatch of the vehicle 104 open. As an example, the trailer hitch 102 is a standard tubular trailer hitch 102, that typically has a hollow tube 106 that has a rearward facing hollow tubular end 108 and a hole in a first side (not shown) of the trailer hitch hollow tube 106 and a hole 110 the second side of the trailer hitch hollow tube 106 that is aligned with the first hole in the trailer hitch hollow tube 106. A hitch locking pin 112 is used to secure the apparatus 100 to the trailer hitch 102. The vehicle 104 may be any type of vehicle, for example a sport utility vehicle, a recreational vehicle, a pickup truck, a truck, a station wagon, or any other suitable vehicle.

Figure 3:
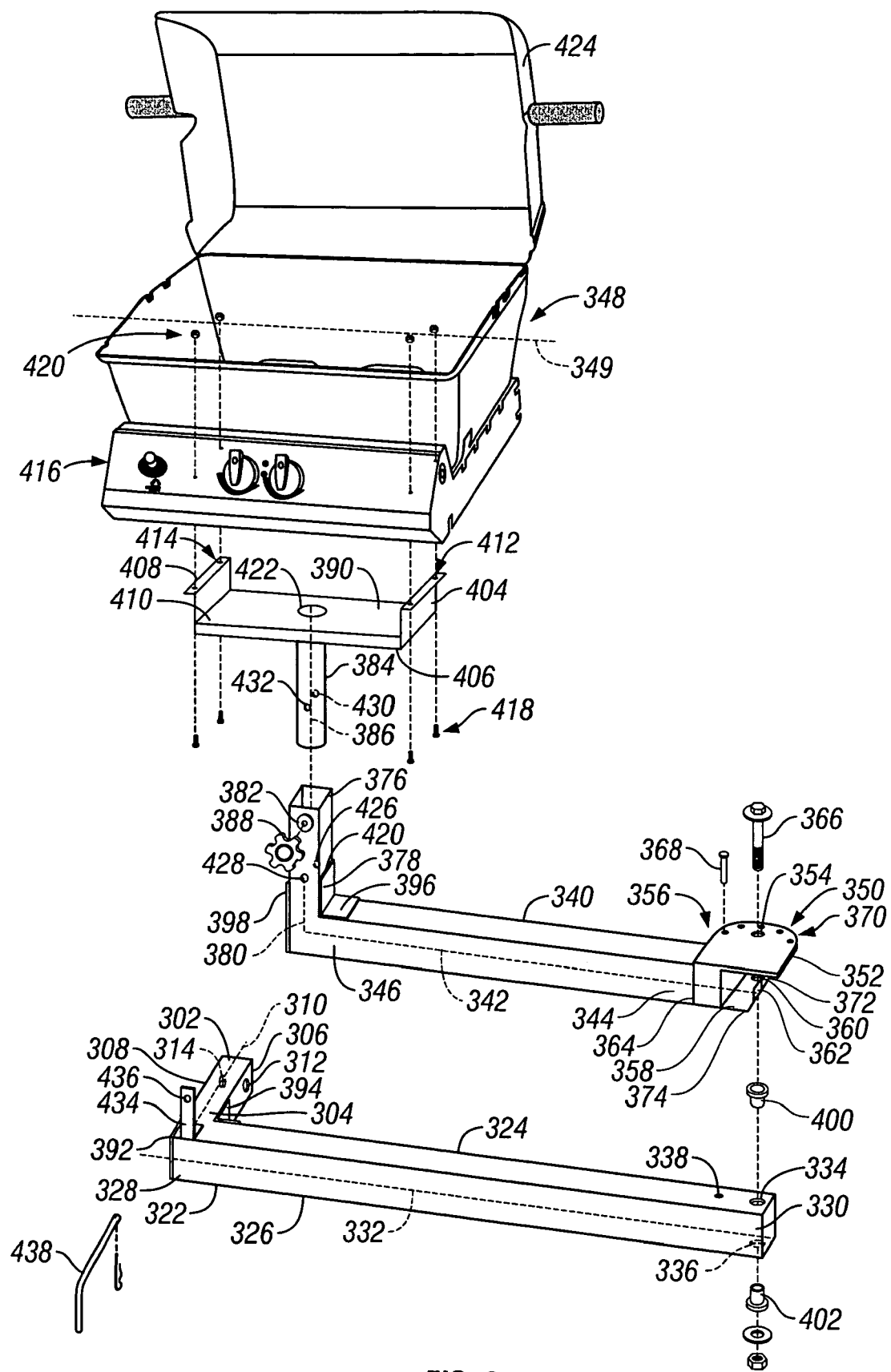
FIG. 3 is an exploded perspective view of an example of an apparatus in accordance with an illustrative embodiment of the invention.

Referring to FIG. 3, the apparatus 100 includes a hitch insertion member 302 that has a base 304, a hitch insertion member first side 306, and a hitch insertion member second side 308. The hitch insertion member defines a hitch insertion member longitudinal axis 310. Optionally, the hitch insertion member 302 could be shortened to position the remainder of the apparatus 100 closer to the vehicle 104. The hitch insertion member first side 306 has a hole 312, and the hitch insertion member second side 308 has a hole 314 aligned with the hole 312 in the hitch insertion member first side 306. As an example, the hitch insertion member 302 may be sized and shaped to fit into the standard tubular trailer hitch 102 (shown in FIGS. 1 and 2). The opening of the hollow tubular end 108 of the trailer hitch 102 typically is two inches by two inches. This type of trailer hitch 102 is commonly provided in the standard tow package on most pickups, sport utility vehicles, and recreational vehicles. To secure the apparatus 100 to this type of trailer hitch 102, the hitch insertion member 302 is inserted into the rearward facing hollow tubular end 108 of the trailer hitch 102, and the holes 312, 314 in the first 306 and second 308 sides of the hitch insertion member 302 are aligned with the hole in the first side and the hole in the second side 110 of the trailer hitch hollow tube 106, and the hitch locking pin 112 is inserted through the holes 312, 314 in the first 306 and second 308 sides of the hitch insertion member 302 and the hole in the first side and the hole in the second side 110 of the trailer hitch hollow tube 106, to secure the hitch insertion member 302 to the trailer hitch 102. Alternatively, the hitch insertion member 302 could be configured to attach to tubular trailer hitch openings that have different sizes and shapes.

Alternatively, the hitch insertion member 302 may be configured for use with different types of trailer hitches. An example of another type of trailer hitch is a draw bar hitch (not shown) that has a horizontal bar having an aperture, and a threaded bar attached to a hitch ball for insertion into the aperture. For attachment to this type of hitch, the hitch insertion member may be configured to have a vertical hole (not shown) or vertical holes into which the threaded bar attached to the hitch ball may be inserted to secure the hitch insertion member to the horizontal bar of the trailer hitch. Alternatively, a pin, rather than the threaded bar attached to a hitch ball, can be inserted into the aperture to secure the hitch insertion member to the trailer hitch. Alternatively, the hitch insertion member may be configured to have a vertical hole or vertical holes into which the hitch ball may be inserted to secure the hitch insertion member to the trailer hitch.

In an alternative example the apparatus 100 could be adapted to be attached to the frame of a vehicle, rather than being attached to a trailer hitch 102. For example, the apparatus 100 could be permanently attached to the frame of a recreational vehicle. Likewise, in an alternative example the apparatus 100 could be adapted to attach to a bumper of a vehicle. In these alternative examples, a support arm 322 could be adapted to be attached directly to the frame or bumper of the vehicle 104, without including a hitch insertion member 302 on the apparatus. Alternatively, instead of the hitch insertion member 302, one or more attachment members (not shown) could be attached to the support arm 322 for attachment to the vehicle frame or bumper. Alternatively, the apparatus 100 could be attached to a portion of the vehicle 104 other than the frame or a bumper.

The apparatus 100 includes the support arm 322 that has a support arm top 324 and a support arm bottom 326, and a support arm first end 328 and a support arm second end 330.

The support arm 322 also defines a support arm longitudinal axis 332. The support arm top 324 has a support arm top primary hinge hole 334, and the support arm bottom 326 has a support arm bottom primary hinge hole 336 that is aligned with the support arm top primary hinge hole 334. If the support arm 322 is solid, the support arm top primary hinge hole 334 and the support arm bottom primary hinge hole 336 would be different ends of a single hole. The support arm top 324 may also have a support arm primary angle securing hole 338. The support arm 322 is attached to the base 304 of the hitch insertion member 302. As an example, the first end 328 of the support arm 322 may be attached to the base 304 of the hitch insertion member 302 with the support arm longitudinal axis 332 substantially perpendicular to the hitch insertion member longitudinal axis 310. However, this perpendicular arrangement is not required.

In one example the support arm top primary hinge hole 334 is located about 2.7 centimeters from the support arm second end 330, and the support arm primary angle securing hole 338 is located about 5.8 centimeters from the support arm top primary hinge hole 334. Typically, the support arm top primary hinge hole 334 will be located within about five centimeters from the support arm second end 330, and the support arm primary angle securing hole 338 will be located within about ten centimeters from the support arm top primary hinge hole 334. However, the support arm top primary hinge hole 334 can be located at other distances from the support arm second end 330, and the support arm primary angle securing hole 338 can be located at other distances from the support arm top primary hinge hole 334. Optionally, more than one set of support arm top and bottom primary hinge holes and primary angle securing holes could be provided in the support arm 322, to permit selectively attaching a primary swing arm 340 to different locations on the support arm 322.

The apparatus 100 includes the primary swing arm 340, which defines a primary swing arm longitudinal axis 342, and which has a primary swing arm hinged end 344 and a primary swing arm swinging end 346. The primary swing arm 340 is typically able to swing one hundred and eighty degrees. However, the apparatus 100 can be configured to permit larger or smaller maximum swing angles for the primary swing arm 340. The capability of the primary swing arm 340 to swing one hundred and eighty degrees is a convenience and safety feature that allows the user to safely locate the cooking device 348 (which may be hot) in a safe location, and to position it in a desirable orientation in relation to the wind. The cooking device 348 defines a cooking device longitudinal axis 349.

This example of the apparatus 100 further includes a primary hinge assembly 350 for pivotally attaching the primary swing arm 340 to the support arm 322. However, any type of hinge, pivot, or other suitable apparatus for pivotally attaching the primary swing arm 340 to the support arm 322 could be used. The primary hinge assembly 350 has a top hinge plate 352 having a central hole 354 for alignment with the support arm top primary hinge hole 334. The top hinge plate 352 may also have a plurality of locking holes 356 for selective alignment with the support arm primary angle securing hole 338. The primary hinge assembly 350 also has a bottom hinge plate 358 having a central hole 360 for alignment with the support arm bottom primary hinge hole 336. The primary hinge assembly 350 may also have a stop wall 362 attached to the bottom hinge plate 358 to establish the maximum angle the primary swing arm longitudinal axis 342 can rotate in relation to the support arm longitudinal axis 332. The primary hinge assembly 350 also includes an attachment wall 364 connected to the top hinge plate 352 and the bottom hinge plate 358. The attachment wall 364 is attached to the primary swing arm 340. As an example, the attachment wall 364 may be attached to the hinged end 344 of the primary swing arm 340. However, the attachment wall 364 could be attached to other locations on the primary swing arm 340. The portion of the primary hinge assembly 350 that includes the top hinge plate 352, bottom hinge plate 358, stop wall 362, and attachment wall 364, may be made from two or more separate pieces that are attached together, or can be formed from a singe piece (for example a single piece of metal).

The primary hinge assembly 350 also includes a primary hinge bar 366 inserted through the central hole 354 in the top hinge plate 352 in the primary hinge assembly 350, the support arm top primary hinge hole 334, the support arm bottom primary hinge hole 336, and the central hole 360 in the bottom hinge plate 358 of the primary hinge assembly 350, to attach the primary swing arm 340 to the support arm 322, and to permit the primary swing arm 340 to rotate in relation to the support arm 322. The primary hinge assembly 350 may also have a primary angle locking bar 368 inserted into one of the plurality of locking holes 356 in the top hinge plate 352 of the primary hinge assembly 350 and into the primary angle securing hole 338 in the support arm 322, to lock the primary swing arm longitudinal axis 342 at an angle in relation to the support arm longitudinal axis 332 selected from a plurality of angles determined by the locations of the locking holes 356 in the top hinge plate 352 of the primary hinge assembly 350 and by the location of the support arm primary angle securing hole 338. The primary angle locking bar 368 may be in a self contained, spring loaded bar housing (not shown), which contains the bar to prevent the bar from being lost. The bar housing may be tack welded to the top hinge plate 352. Alternatively, the primary angle locking bar 368 is not in a bar housing. Optionally, the primary angle locking bar 368 may be held in place with a clip or pin.

Optionally, the central hole 354 in the top hinge plate 352 of the primary hinge assembly 350 is located in an overhang area 370 of the top hinge plate 352, and the plurality of locking holes 356 in the top hinge plate 352 of the primary hinge assembly 350 are also located in the overhang area 370 of the top hinge plate 352. Also optionally, the central hole 360 in the bottom hinge plate 358 of the primary hinge assembly 350 is located in an overhang area 372 of the bottom hinge plate 358, and the stop wall 362 is partially contiguous with the overhang area 372 and a nonoverhang area 374 of the bottom hinge plate 358.

The apparatus 100 also includes a pedestal 376 that has a base 378. The pedestal 376 defines a pedestal longitudinal axis 380. The base 378 of the pedestal 376 is attached to the primary swing arm 340. As an example, the base 378 of the pedestal 376 may be attached to the swinging end 346 of the primary swing arm 340 with the pedestal longitudinal axis 380 substantially perpendicular to the primary swing arm longitudinal axis 342. However, this perpendicular arrangement is not required. For example, in embodiments of the invention where the primary swing arm 340 is not horizontal, the pedestal longitudinal axis 380 is not perpendicular to the primary swing arm longitudinal axis 342. Also, the pedestal 376 could be attached to the primary swing arm 340 at a location other than the swinging end 346 of the primary swing arm 340. The pedestal 376 may have a rotation adjustment locking hole 382, which may be threaded. The apparatus 100 also includes a column 384, which is at least partially inserted into the pedestal 376. The column 384 defines a column longitudinal axis 386. The apparatus 100 may also include a column rotation locking bar 388, which may be threaded, that is secured through the rotation adjustment locking hole 382 to lock the column 384 at a selected rotation within the pedestal 376, by tightening the column rotation locking bar 388 against the column 384. The column rotation locking bar 388 could also be used to lock the column 384 at a selected height within the pedestal 376, by tightening the column rotation locking bar 388 against the column 384. Alternatively, a plurality of holes could be provided in the column 384, into which the column rotation locking bar 388 could be selectively inserted, to lock the column 384 at a selected height within the pedestal 376, to lock the cooking device 348 at a selected height. Alternatively, a plurality of fixed locating pins attached to the pedestal 376 could be used to select a desired height. The apparatus may also include a lateral member 390 attached to the column 384. A collar swivel (not shown) could be attached at or near the top of the column 384, and to the lateral member 390, to permit the column 394 to rotate in relation to the lateral member 390, to permit three hundred sixty degree (or less) rotation of the cooking device 348. The collar swivel could have a securing knob, for example attached to a threaded or spring loaded bar, for locking the collar swivel at a selected rotation.

The apparatus 100 may also include a support arm outside gusset 392 attached to the support arm 322 and the hitch insertion member 302. The apparatus 100 may also include a support arm inside gusset 394 attached to the support arm 322 and the hitch insertion member 302. The apparatus 100 may also include an inside pedestal gusset 396 attached to the pedestal 376 and the primary swing arm 340. Optionally, the inside pedestal gusset 396 could have a threaded hole aligned with a rotation adjustment locking hole in the pedestal 376. The apparatus 100 may also have an outside pedestal gusset 398 attached to the pedestal 376 and the primary swing arm 340. The apparatus 100 may also have a top hinge hole liner 400 inside the support arm top primary hinge hole 334, and a bottom hinge hole liner 402 inside the support arm bottom primary hinge hole 336. The apparatus 100 may also have a first bracket 404 attached to a first end 406 of the lateral member 390 and a second bracket 408 attached to a second end 410 of the lateral member 390. The first bracket 404 may have a plurality of holes 412 and the second bracket 408 may have a plurality of holes 414, and the cooking device 348 (for example a barbeque) may have a plurality of holes 416 aligned with the plurality of holes 412 in the first bracket 404 and the plurality of holes 414 in the second bracket 408. The apparatus 100 may also include a plurality of bolts 418 and a plurality of nuts 420 for attaching the cooking device 348 to the first bracket 404 and the second bracket 408, wherein the cooking device 348 is attached to the lateral member 390 by attaching the cooking device 348 to the first bracket 404 and the second bracket 408 by inserting a bolt from the plurality of bolts 418 through each of the aligned holes in the cooking device 348 and the first bracket 404, and through each of the aligned holes in the cooking device 348 and the second bracket 408, and securing each bolt with a nut from the plurality of nuts 420. Typically, 6-8 bolts are used, although different numbers could be used. The lateral member 390 may have a lateral member hole 422, and the column 384 may be inserted into the lateral member hole 422 and attached to the lateral member 390. However, the cooking device 348 could be attached to the primary swing arm 340 in any other suitable way. For example the column 384 may be attached to the cooking device 348 with one or more support arms (not shown), and the lateral member 390 and the first bracket 404 and the second bracket 408 need not be included.

A cross section of the hitch insertion member 302 perpendicular to the hitch insertion member longitudinal axis 310 may be a square, rectangle, circle, oval or any other suitable shape. A cross section of the support arm 322 perpendicular to the support arm longitudinal axis 332 may be a square, rectangle, circle, oval or any other suitable shape. A cross section of the primary swing arm 340 perpendicular to the primary swing arm longitudinal axis 342 may be a square, rectangle, circle, oval or any other suitable shape. A cross section of the pedestal 376 perpendicular to the pedestal longitudinal axis 380 may be a square, circle, triangle, pentagon, hexagon, or any other suitable shape. A cross section of the column 384 perpendicular to the column longitudinal axis 386 may be a circle or any other suitable shape. The hitch insertion member 302 (and the collar insertion member 1626, 1646 discussed below), the support arm 322, the primary swing arm 340, and the column 384 may be hollow, tubular, bar stock, solid, honeycombed or any other suitable structure, and may have different structures. The pedestal 376 is hollow to permit insertion of the column 384.

The hitch insertion member 302, support arm 322, primary swing arm 340, primary hinge assembly 350, pedestal 376, column 384, lateral member 390, first bracket 404, second bracket 408, and the other components of the apparatus 100 (and the apparatus 1600, 2000 discussed below) may be made of steel, stainless steel, aluminum, carbon fiber, plastic, or any other suitable material. Different components of the apparatus 100 may be made from different materials. Any suitable type of finish may be used for the components of the apparatus 100, for example, zinc type 1, zinc type 2, paint, powder coat, or black oxide could be used for steel components; polished stainless steel could be used for stainless steel components; and soft anodized, hard anodized, paint, or powder coat could be used for aluminum components. Chrome plating could be applied to any material, and nickel plating could be applied to any material except plastic. The apparatus 100 could be painted to match the color of the vehicle 104 to which the apparatus 100 is removably attached.

The cooking device 348 may be attached to the lateral member 390. However, the apparatus 100 does not have to include a cooking device 348. The cooking device 348 could be, for example, a barbeque, a griddle, a wok, a gas burner, a smoker, a rotisserie, a deep fryer, or any other suitable device for cooking. Many of the possible cooking devices will have a grill. Almost any grilling area could be used, but typically the grilling area will range from about one hundred square inches to about two thousand square inches. Different sizes and types of barbeque models can be used as the cooking device 348, and almost any barbeque could be used. Appropriate gas barbeques can have one, two, or more burners. Propane fueled barbeques having almost any BTU rating could be used, for example ten thousand BTU (or less) to one hundred thousand BTU (or more). A suitable barbeque can be obtained, for example, from Onward Manufacturing Company, Waterloo, Ontario, Canada. Although not required, the cooking device 348 typically will have a cover 424. The cover 424 may include a logo.

The cooking device 348, which for example may be a barbeque, can have almost any weight, and typically will range from, for example, about twenty-five pounds to about five hundred pounds. However, a lighter or heavier cooking device 348 could be used. A typical barbeque used as the cooking device 348 may weigh about twenty-five pounds. The weight of the apparatus 100 including a barbeque (but not including a fuel tank) may range, for example, from about thirty pounds to about five hundred pounds, commonly will be about thirty pounds to about seventy-five pounds, and typically will be about fifty pounds. However, the weight of the apparatus 100 could be lighter than thirty pounds or heavier than five hundred pounds. Typically, a propane tank will weigh from about ten pounds to about twenty pounds, but could weigh less than ten pounds or more than twenty pounds.

The fuel for the cooking device 348 can be, for example, propane (LPG), charcoal, wood, natural gas, electricity, or any other type of gas or other fuel used for cooking. A wide variety of standard fuel tanks, for example standard propane tanks, could be connected to the cooking device 348, typically by using a standard connector for quick connection and disconnection. Optionally, the apparatus 100 can include an attachment for connecting the cooking device 348 to a gas source on a vehicle, or to a land based gas source. For example, when used with a recreational vehicle (RV), the apparatus 100 could be attached to a propane tank on the recreational vehicle that is also used for the stove, refrigerator, and other appliances in the recreational vehicle.

Optionally, the pedestal 376 has a pedestal front securing hole 426 and a pedestal back securing hole 428, wherein the pedestal front securing hole 426 and the pedestal back securing hole 428 are on opposite sides of the pedestal 376 and are aligned with each other. Similarly, optionally, the column 384 has a column front securing hole 430 and a column back securing hole 432, wherein the column front securing hole 430 and the column back securing hole 432 are on opposite sides of the column 384 and are aligned with each other. The column front securing hole 430 is located to permit alignment with the pedestal front securing hole 426, and the column back securing hole 432 is located to permit alignment with the pedestal back securing hole 428 when the column 384 is inserted into the pedestal 376. The apparatus may also optionally include a securing wall 434 attached to the support arm 322. The securing wall 434 has a securing wall hole 436 located to align with the pedestal back securing hole 428 when the primary swing arm 340 is in a closed position adjacent the support arm 322. The apparatus 100 also optionally includes a locking bar 438 for insertion into the securing wall hole 436, the pedestal back securing hole 428, the column back securing hole 432, the column front securing hole 430, and the pedestal front securing hole 426, to secure the apparatus 100 for transport. A clip may be attached to the locking bar 438 to secure the locking bar 438, or alternatively, the locking bar may be part of a lock or may be attached to a lock. This arrangement of the securing holes and the securing wall 434 and the locking bar 438 permits securing or locking the column 384 (and therefore also the cooking device 348) to the apparatus 100. This arrangement also provides for securing or locking the column 384 and pedestal 376 to the securing wall 434 on the support arm 322, thereby maintaining the primary swing arm 340 in a closed position next to the support arm 322 for safely transporting the apparatus 100.

Optionally, the apparatus 100 could include a sensing device (not shown), for example an electrical or magnetic switch or a photovoltaic sensor, which could be attached, for example, to the support arm 322, the primary swing arm 340, the primary hinge assembly 350, or the securing wall 434, to detect when the primary swing arm 340 is in a closed position next to the support arm 322. The sensing device could be coupled to a light, buzzer, speaker, or other type of indicator in the vehicle 104, to notify the user when the apparatus 100 is not in a closed position when transporting or preparing to transport the apparatus 100.

Figure 4:
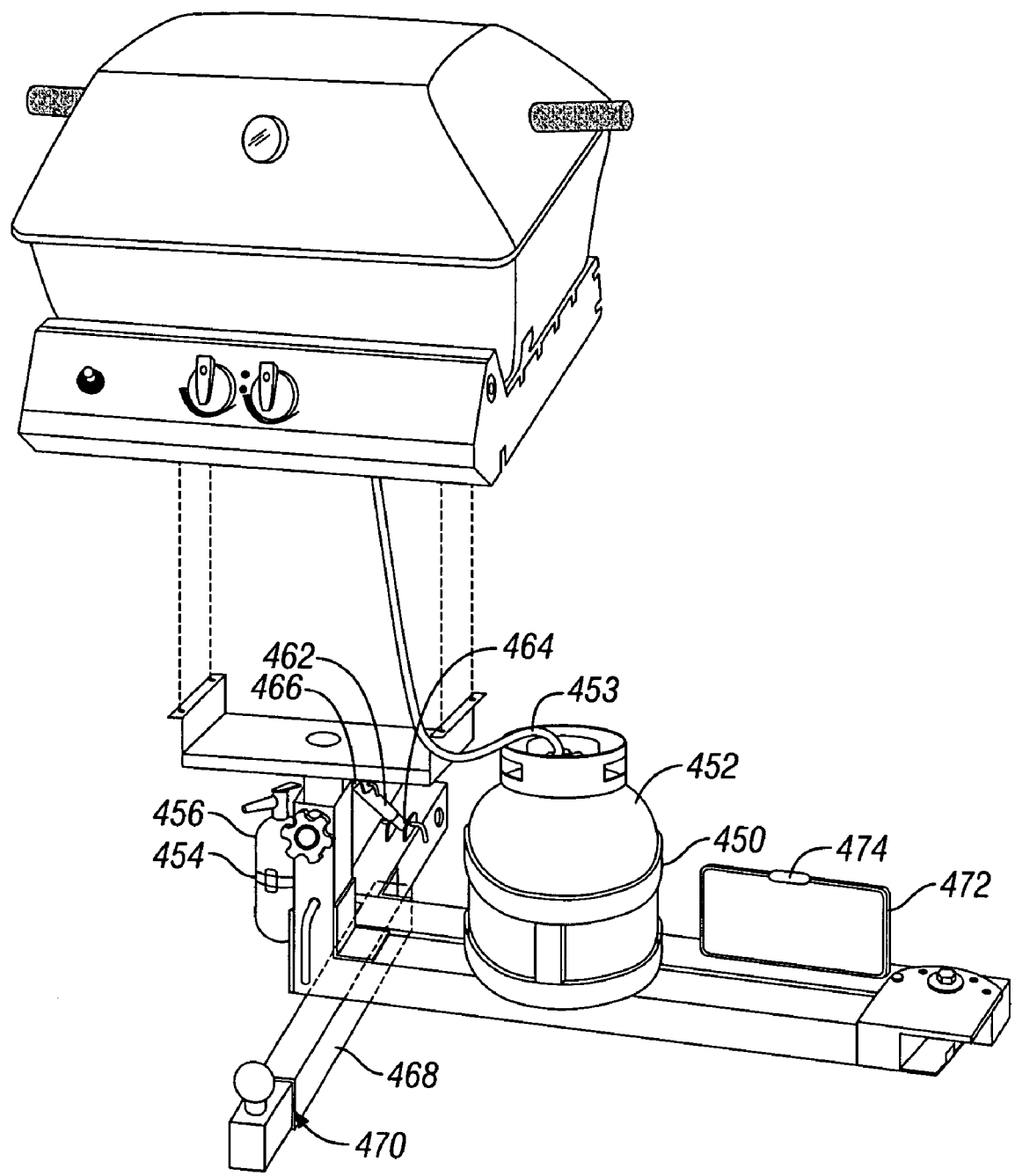
FIG. 4 is a perspective view of an example of an apparatus in accordance with an illustrative embodiment of the invention.

Optionally, as shown in FIG. 4, the apparatus includes a fuel tank holder 450 attached to the primary swing arm 340 for attaching a fuel tank 452 to the apparatus 100. Alternatively, the fuel tank holder 450 could be attached to the support arm 322, the pedestal 376, or the hitch insertion member 302. Other types of fuel tank holders could also be used. Alternatively, rather than including a fuel tank holder on the apparatus 100, the fuel tank 452 could be placed on the ground when connected to the cooking device 348 for cooking, and could be placed in the vehicle 104 when transporting the apparatus 100. The fuel tank 452 may be stored in the vehicle, or placed in the fuel tank holder 450, when transporting the apparatus 100. The apparatus also 100 optionally includes fuel hose retaining clips (not shown) for the fuel hose 453.

Optionally, as shown in FIG. 4, the apparatus 100 could also include a fire extinguisher holder 454 attached to the pedestal 376, for attaching a fire extinguisher 456 to the apparatus 100. Alternatively, the fire extinguisher holder 454 could be attached to the support arm 322, the primary swing arm 340, or the hitch insertion member 302. The fire extinguisher 456 may be stored in the vehicle 104, or placed in the fire extinguisher holder 454, when transporting the apparatus 100.

Optionally, additional items could be permanently or temporarily attached to the support arm 322, the primary swing arm 340, and/or the pedestal 376. The additional items could include one or more coolers (ice chests), refrigerators, cutting surfaces (for example cutting boards), condiment trays, and compartments or drawers for storing cooking utensils, grill covers, lights (for example for night barbequing), side-auxiliary grills (auxiliary burners), and/or additional cooking devices.

Optionally, as shown in FIG. 4, the apparatus could include a shock dampening device 462 having a shock dampening device first end 464 permanently or removably attached to the hitch insertion member 302 (or the support arm 322 or the primary swing arm 340), and a second shock dampening device end 466 permanently or removably attached to the lateral member 390 (or the cooking device 348), to dampen the vibration of the cooking device 348 when transporting the apparatus 100. The shock dampening device 462 may be a shock absorber or any other device for dampening movement and vibration of the cooking device 348.

Optionally, as shown in FIG. 4, the apparatus may include a supplemental trailer hitch receptacle 468, and may also include a trailer hitch ball assembly 470 which may be attached to the supplemental trailer hitch receptacle 468. The supplemental trailer hitch receptacle 468 is attached to the hitch insertion member 302, to enable the user to tow something (for example a trailer or boat) with the vehicle 104, while the apparatus 100 is attached to the trailer hitch 102 of the vehicle 104. The supplemental trailer hitch receptacle 468, and the trailer hitch ball assembly 470 could be temporarily attached and removable, or permanently attached, to the apparatus 100. Also, the trailer hitch ball assembly 470 could be permanently or removably attached to the supplemental trailer hitch receptacle 468. Alternatively, a trailer hitch ball assembly could be attached directly to the apparatus 100 without using a supplemental trailer hitch receptacle 468.

Optionally, as shown in FIG. 4, the apparatus includes a license plate mount 472 and a license plate light 474 attached to the support arm 322. Alternatively, the license plate mount 472 and license plate light 474 could be attached to the primary swing arm 340, the hitch insertion member 302, the pedestal 376, or any other portion of the apparatus 100.

Optionally, the apparatus could be configured to be self-aligning for transport. For example, the cooking device 348 would be automatically rotated to orient the cooking device longitudinal axis 349 substantially parallel with the support arm longitudinal axis 332, when the primary swing arm 340 is moved to a closed position next to the support arm 322. This could be accomplished, for example, with an alignment arm (not shown) connected to the swing arm and the column 384. The apparatus could also be configured to be self closing.

Optionally, one or more springs (not shown) could be attached to the support arm 322 and the primary swing arm 340 to assist in closing the apparatus 100 for transport (positioning the primary swing arm 340 next to the support arm 322). Optionally, one or more springs (not shown) could be attached to the apparatus 100 to assist in raising the cooking device 348 when adjusting the cooking device 348 to a desired height for cooking.

Optionally, one or more electrical motors (not shown) could be attached to the support arm 322 and the primary swing arm 340 to swing the primary swing arm 340 away from the support arm 322, and to close the primary swing arm 340 to a position next to the support arm 322. A motor could also be attached to the column 384 or lateral member 390 and/or other part of the apparatus 100 to raise or lower the cooking device 348. The motor or motors could be operated with a wireless remote control device, or with a switch in the vehicle wired to the motor or motors, or with a switch on the apparatus 100 wired to the motor or motors.

Optionally, the apparatus 100 could include speakers (not shown) that could be connected to a vehicle audio system.

Optionally, a ground support leg (not shown) could be used with the apparatus 100 to help support the cooking device 348 when cooking food that is particularly heavy. The ground support leg could be a vertical post with a base. The ground support leg could be placed between the ground and either the primary swing arm 340, the lateral member 390, the first bracket 404, the second bracket 408, or the cooking device 348, to help support the cooking device 348.

Optionally, the apparatus 100 could be placed in a carrier stand (not shown) when the apparatus is not attached to a vehicle. As an example, the carrier stand may have wheels to permit rolling the carrier stand on the ground. The carrier stand could be rolled to a location in the user's garage for storage of the apparatus 100, and could be rolled to the trailer hitch 102 on the vehicle 104 when attaching the apparatus 100 to the trailer hitch 102. As an example, the carrier stand could be configured to carry the apparatus 100 so that the hitch insertion member 302 is at a height that permits easy insertion into the trailer hitch 102 on the vehicle 104. The carrier stand could also be configured to permit adjusting the height of the apparatus 100 when the apparatus 100 is in the carrier stand, to facilitate inserting the hitch insertion member 302 into the trailer hitch 102. The apparatus 100 could also be used as a backyard, tailgate, or beach barbeque when placed in the carrier stand. Optionally, the carrier stand could be made with removable wheels, or without wheels.

B. Inclined Primary Swing Arm

Figure 5:
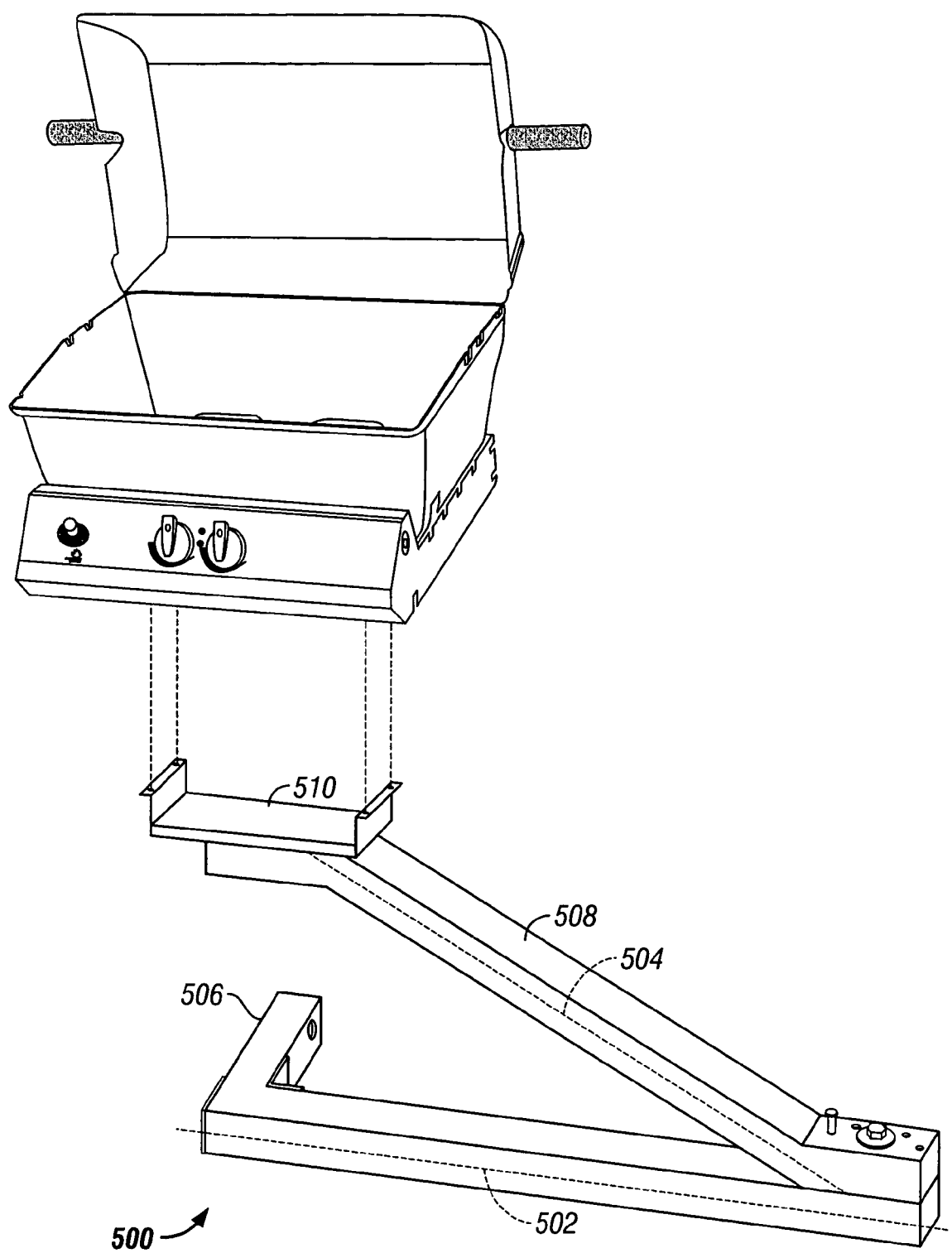
FIG. 5 is a perspective view of another example of an apparatus in accordance with an illustrative embodiment of the invention.

As an example, as shown in FIG. 4, the support arm longitudinal axis 332 and the primary swing arm longitudinal axis 342 are substantially parallel and horizontal, when the hitch insertion member 302 is oriented to be inserted into the trailer hitch 102. In another example of the apparatus 500 shown in FIG. 5, the support arm longitudinal axis 502 is substantially horizontal and the swing arm longitudinal axis 504 defines an angle alpha from horizontal, when the hitch insertion member 506 is oriented to be inserted into the trailer hitch 102. In the apparatus 500 shown in FIG. 5, the primary swing arm 508 is attached directly to the lateral member 510, and the apparatus 500 may not have a pedestal 376 or column 384.

C. Shapes of the Support Arm and Primary Swing Arm

Figure 6:
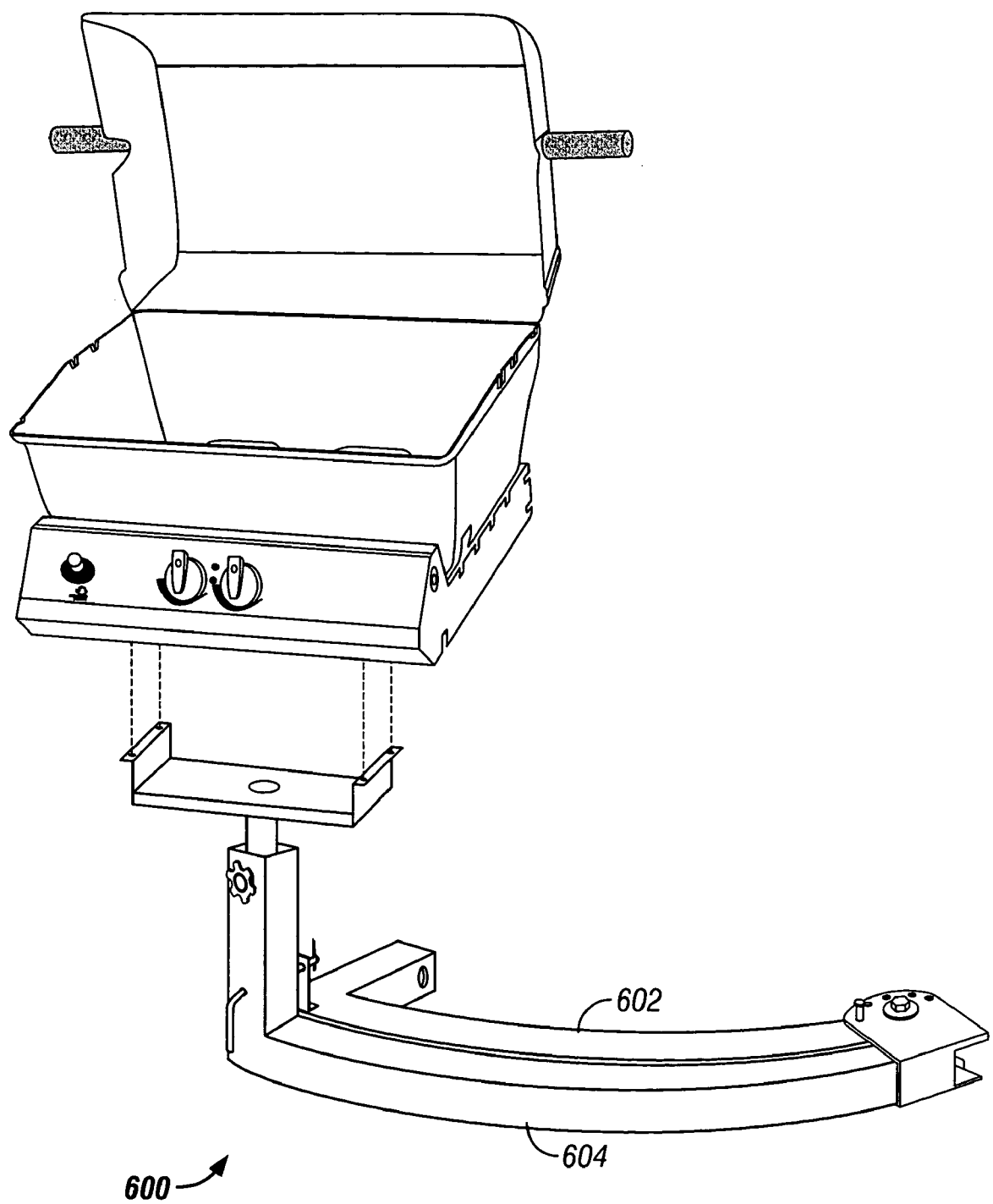
FIG. 6 is a perspective view of another example of an apparatus in accordance with an illustrative embodiment of the invention.
Figure 7:
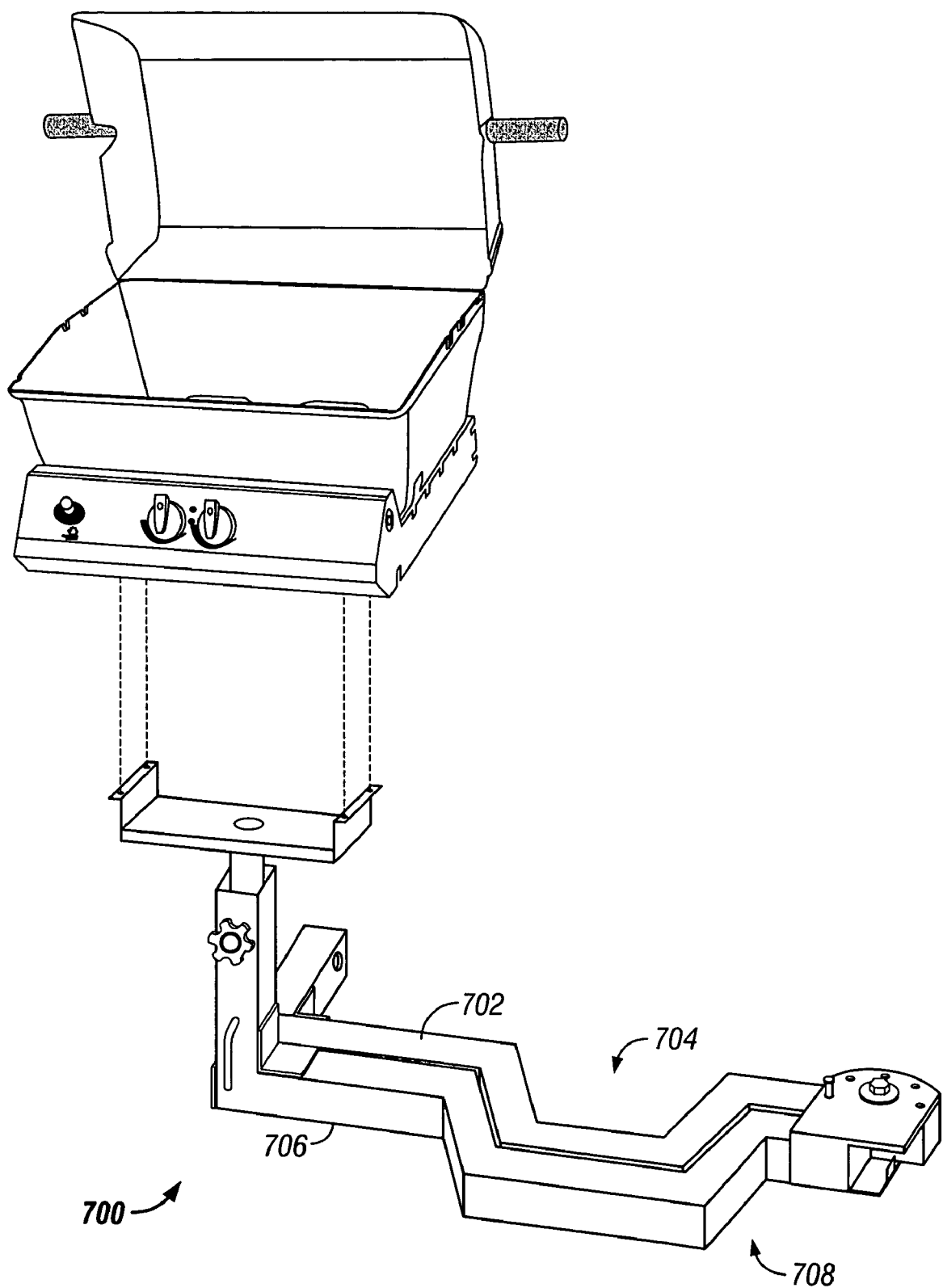
FIG. 7 is a perspective view of another example of an apparatus in accordance with an illustrative embodiment of the invention.

In the example of the apparatus 100 shown in FIG. 4, the support arm 322 and the primary swing arm 340 are substantially straight. In another example of the apparatus 600 shown in FIG. 6, the support arm 602 and the primary swing arm 604 are curved, for example, to contour to the shape of a vehicle or to the shape of item(s) attached to a vehicle. Alternatively, the support arm 602 could be straight and the primary swing arm 604 could be curved, or, the support arm 602 could be curved and the primary swing arm 604 could be straight. Optionally, the pedestal 376 and column 384 could be curved (whether or not the support arm 602 and/or the primary swing arm 604 are curved). In another example of the apparatus 700 shown in FIG. 7, the support arm 702 has extra segments 704 and the primary swing arm 706 has extra segments 708, for example, to fit the apparatus 700 around a spare tire or fuel container or water container. Alternatively, one or more additional extra segments, or less additional segments, could be used which are configured differently than the extra segments 704, 708 shown in FIG. 7. Alternatively only the support arm 702 or only the primary swing arm 706 has one or more extra segments, for example, to support a gas or water container. One or more straight or curved extra segments could also be included in a curved support arm and/or a curved primary swing arm, and curved extra segments could also be included in a straight support arm and/or a straight primary swing arm. Further, one or more extra segments could be included in the support arm and/or the primary swing arm and/or the secondary swing arm in the other examples of the apparatus described herein.

D. Vertical Members and Telescoping Portions

Figure 8:
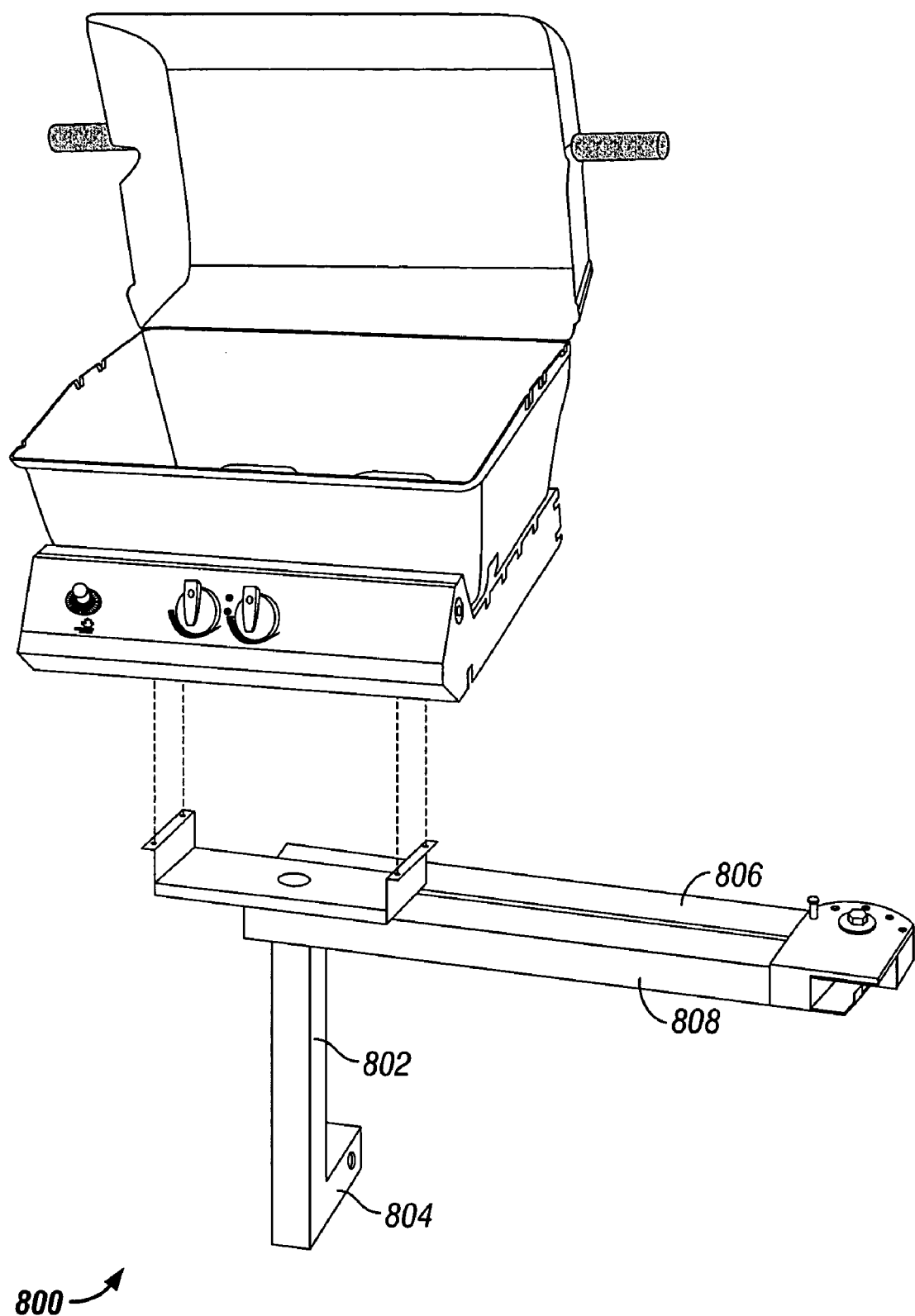
FIG. 8 is a perspective view of another example of an apparatus in accordance with an illustrative embodiment of the invention.

In another example of the apparatus 800 shown in FIG. 8, a hitch vertical member 802 is attached to the hitch insertion member 804 and the support arm 806, to attach the support arm 806 to the hitch insertion member 804, and to locate the support arm 806 and the primary swing arm 808 in a plane that is a specified distance above the trailer hitch 102. Alternatively, the hitch vertical member 802 could extend below the hitch insertion member 804 and could be used to locate the support arm 806 and the primary swing arm 808 in a plane that is a specified distance below the trailer hitch 102. Optionally, the hitch vertical member 802 could have an outer telescoping portion and an inner telescoping portion, to permit adjustment of the length of the hitch vertical member 802, which optionally could be locked at a desired length with a threaded locking pin that could be inserted in a threaded hole in the outer telescoping portion to push against the inner telescoping portion.

Figure 9:
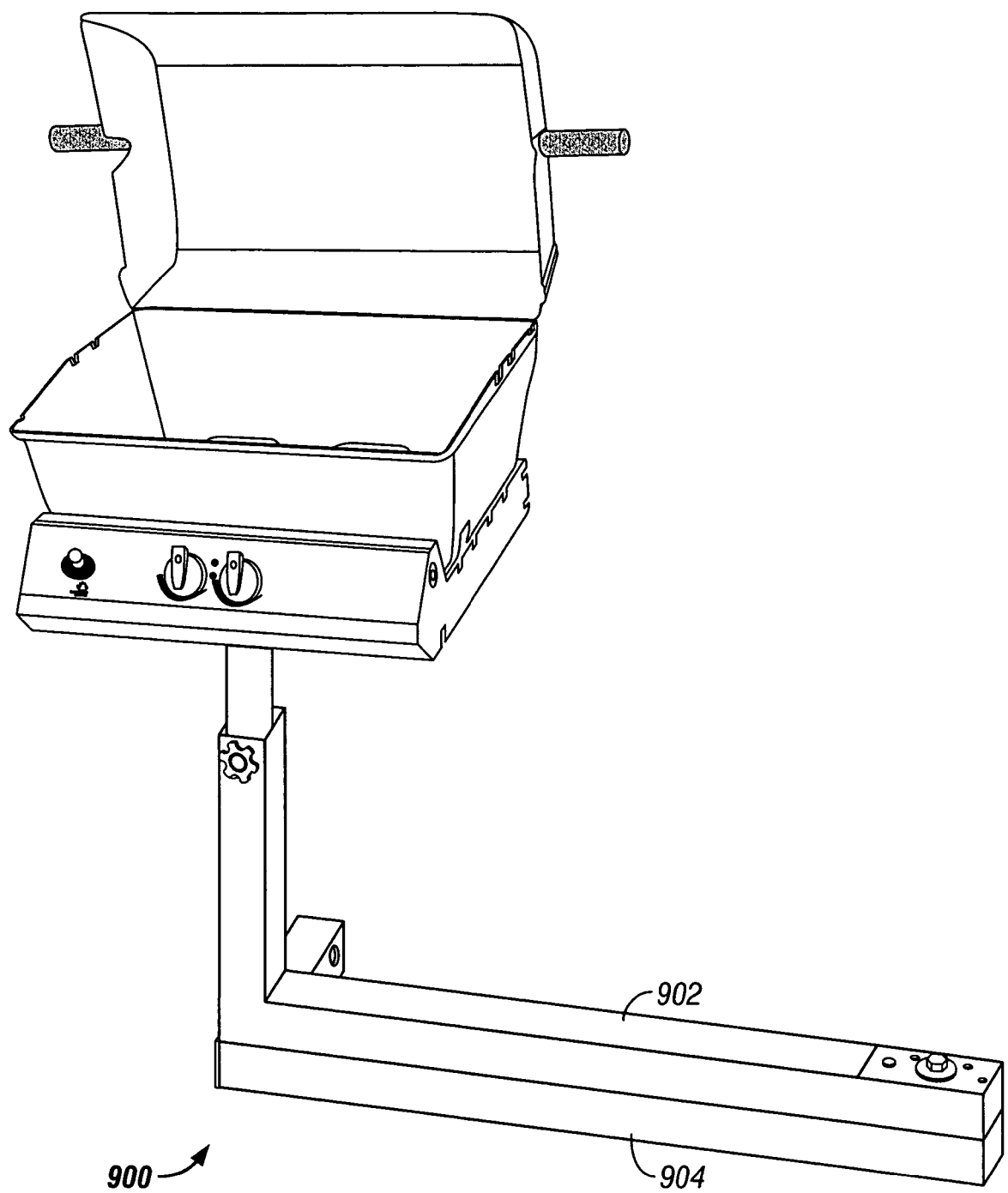
FIG. 9 is a perspective view of another example of an apparatus in accordance with an illustrative embodiment of the invention.

In another example of the apparatus 900 shown in FIG. 9, the primary swing arm 902 is above the support arm 904. Alternatively, the primary swing arm 902 could be located below the support arm 904.

Figure 10:
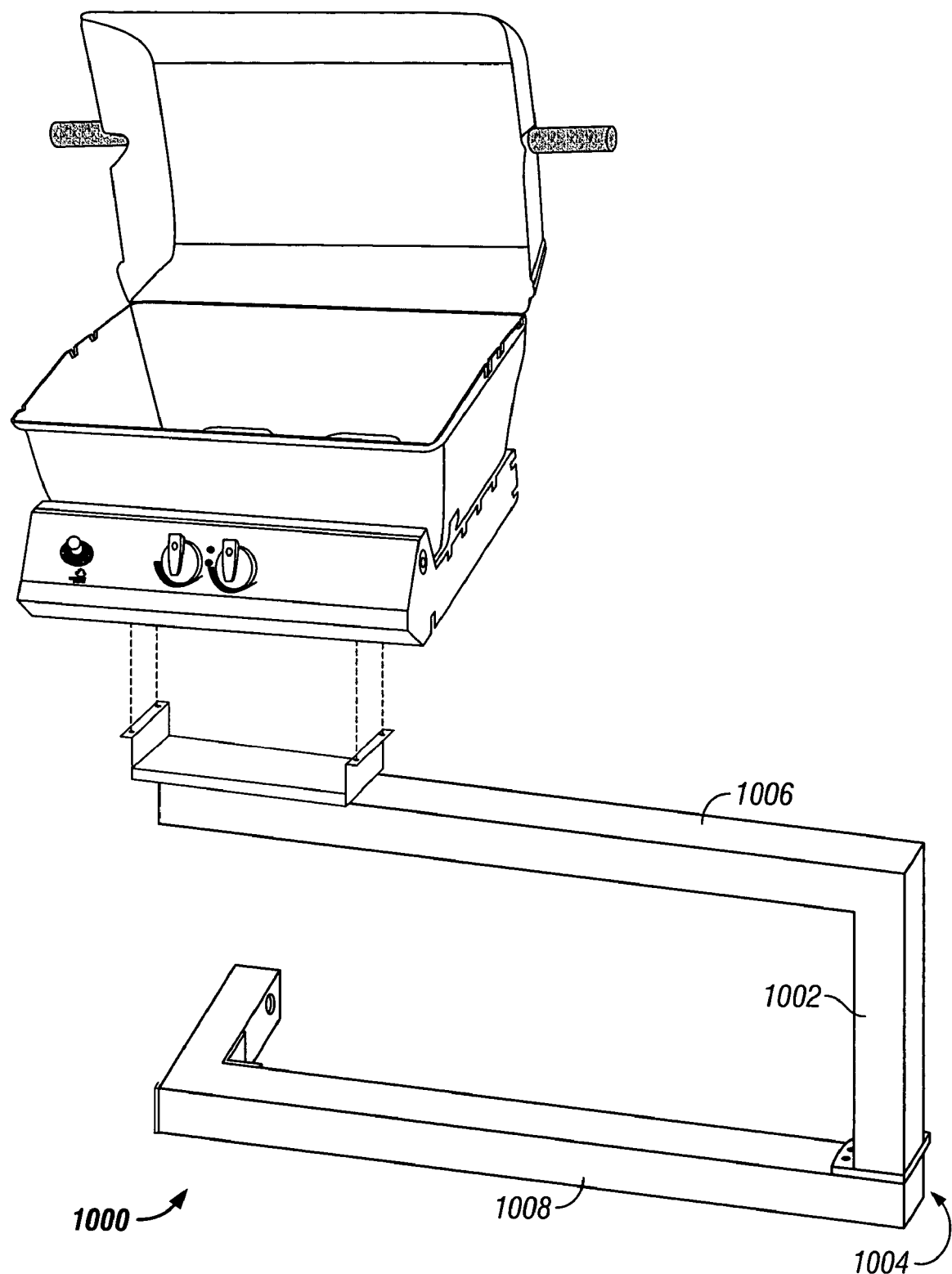
FIG. 10 is a perspective view of another example of an apparatus in accordance with an illustrative embodiment of the invention.

In another example of the apparatus 1000 shown in FIG. 10, a support vertical member 1002 is attached to the primary hinge assembly 1004 and the primary swing arm 1006, to position the primary swing arm 1006 a specified distance above the support arm 1008. Alternatively, the support vertical member 1002 could extend below the support arm 1008 and could be used to position the primary swing arm 1006 a specified distance below the support arm 1008. Optionally, the support vertical member 1002 could have an outer telescoping portion and an inner telescoping portion, to permit adjustment of the length of the support vertical member 1002, which optionally could be locked at a desired length with a threaded locking pin that could be inserted in a threaded hole in the outer telescoping portion to push against the inner telescoping portion.

Figure 11:
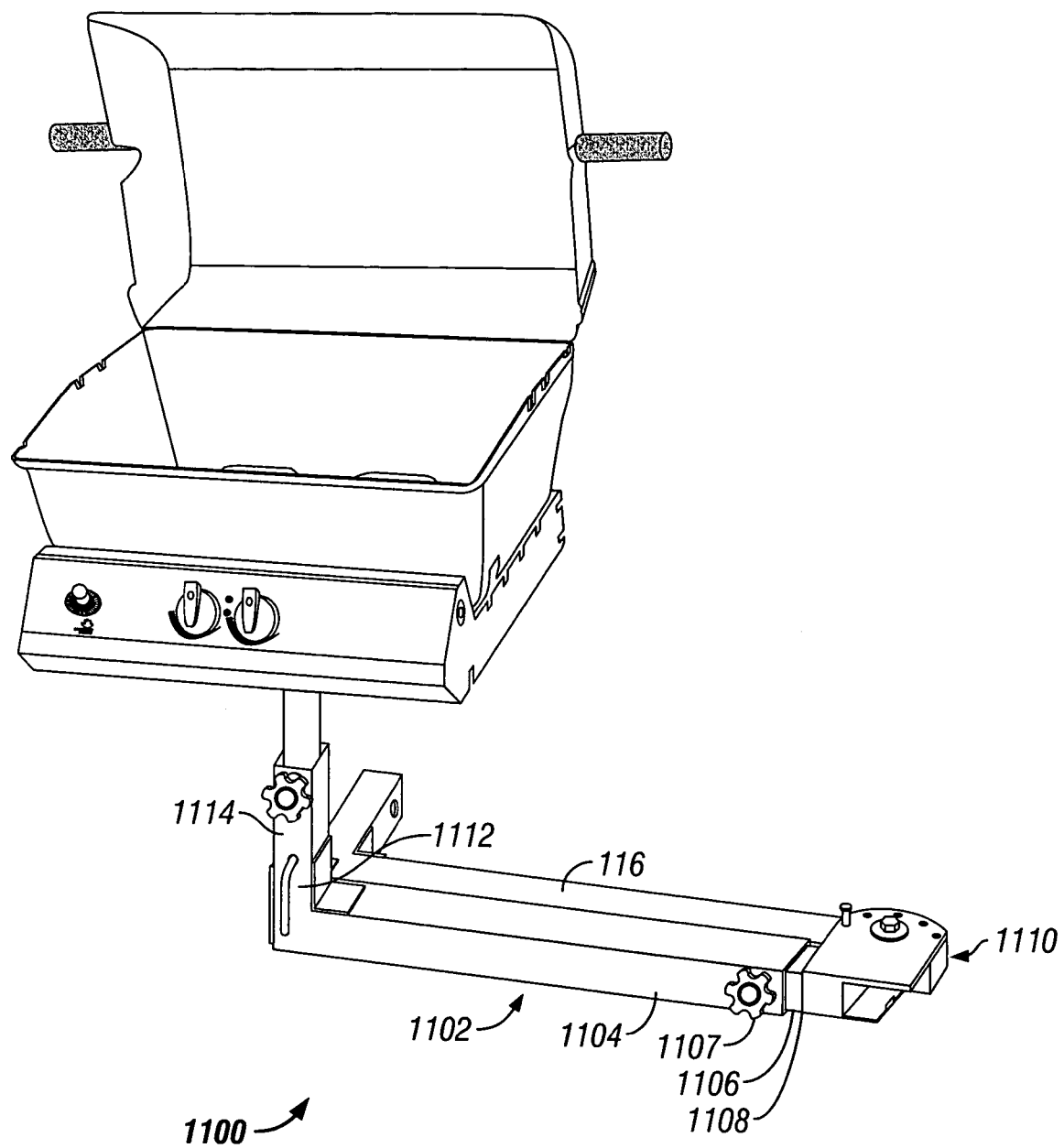
FIG. 11 is a perspective view of another example of an apparatus in accordance with an illustrative embodiment of the invention.

In another example of the apparatus 1100 shown in FIG. 11, the primary swing arm 1102 has a retainer portion 1104 and a telescoping insertion portion 1106 that is partially inserted into the retainer portion 1104 and secured to the retainer portion 1104, wherein the telescoping insertion portion 1106 can be partially extended from within the retainer portion 1104 to extend the length of the primary swing arm 1102. A retainer knob 1107 connected to a threaded retainer bar may be inserted into a threaded hole in the retainer portion 1104, to push against the telescoping insertion portion 1106 to hold the telescoping insertion portion 1106 in place. In this example the attachment wall 1108 of the primary hinge assembly 1110 is attached to the telescoping insertion portion 1106 of the primary swing arm 1102, and the base 1112 of the pedestal 1114 is attached to the retainer portion 1104 of the primary swing arm 1102. Similarly, the support arm 1116 could have a retainer portion (not shown) and a telescoping insertion portion (not shown) to extend the length of the support arm.

E. Swinging Support Arm

Figure 12:
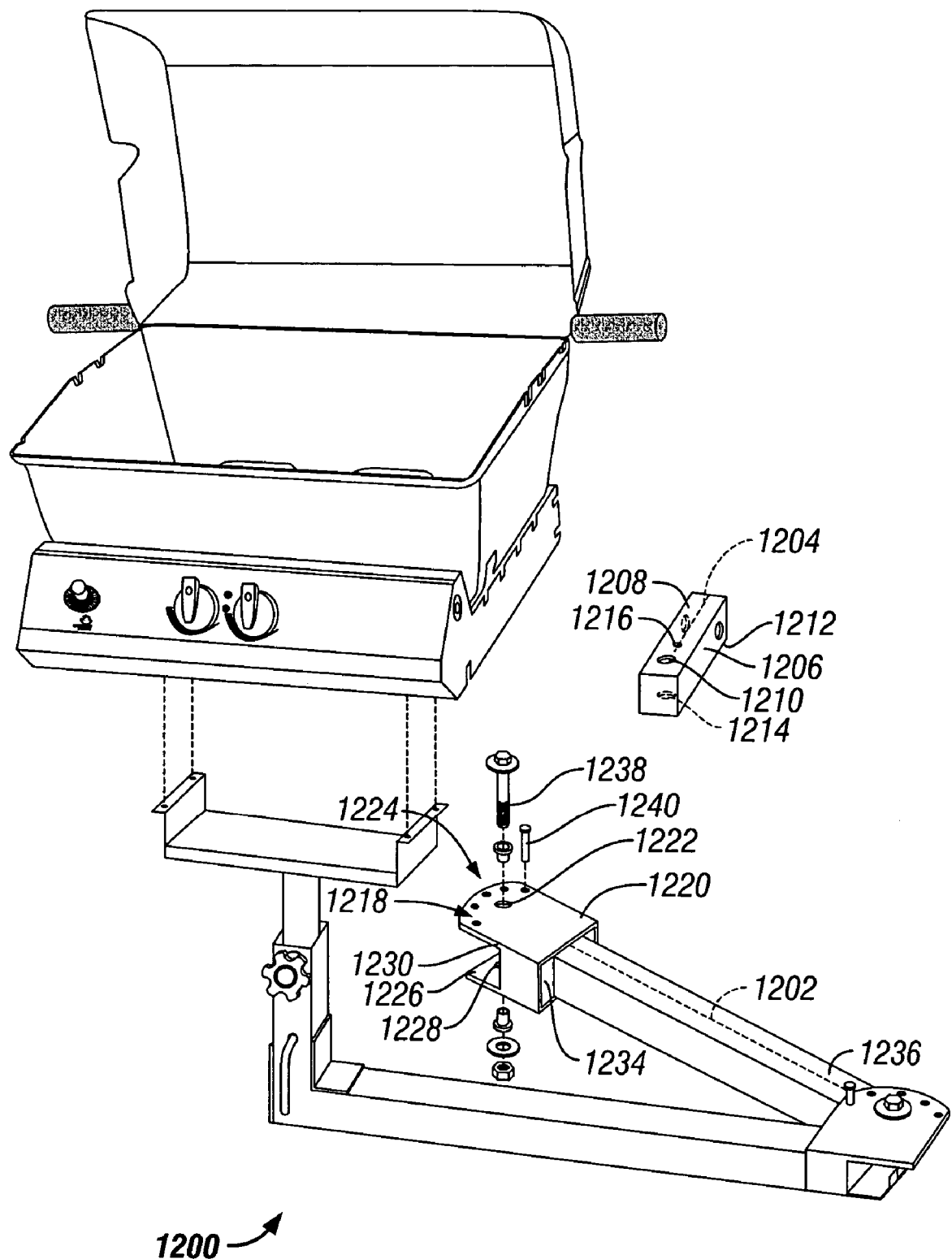
FIG. 12 is a partially exploded perspective view of another example of an apparatus in accordance with an illustrative embodiment of the invention.

Another example of the invention may be embodied by the apparatus 1200 shown in FIG. 12. The apparatus 1200 generally has the features of the apparatus 100, and also has the following additional components and features. In one implementation of the example of the invention shown in FIG. 12, the support arm longitudinal axis 1202 could swing approximately one hundred eighty degrees, from perpendicular to the hitch insertion member longitudinal axis 1204 in a first direction, to perpendicular to the hitch insertion member longitudinal axis 1204 in a second opposite direction. For example, the support arm longitudinal axis 1202 could be swung to a position substantially parallel to a rear bumper of the vehicle 104 in one direction, and then could be swung one hundred and eighty degrees to a position substantially parallel with the rear bumper of the vehicle 104 an opposite direction. However, the range of swing could be greater, or smaller, than one hundred eighty degrees. In the apparatus 1200, the hitch insertion member 1206 has a hitch insertion member top 1208 that has a hitch insertion member top hinge hole 1210, and the hitch insertion member 1206 also has a hitch insertion member bottom 1212 that has a hitch insertion member bottom hinge hole 1214 that is aligned with the hitch insertion member top hinge hole 1210. The hitch insertion member top 1208 also has a hitch insertion member angle securing hole 1216.

The apparatus 1200 also includes a central hinge assembly 1218. However, any type of hinge, pivot, or other suitable apparatus for pivotally attaching the support arm 1236 to the hitch insertion member 1206 could be used. The central hinge assembly 1218 has a top hinge plate 1220 having a central hole 1222 for alignment with the hitch insertion member top hinge hole 1210. The top hinge plate 1220 may also have a plurality of locking holes 1224 for selective alignment with the hitch insertion member angle securing hole 1216. The central hinge assembly 1218 also has a bottom hinge plate 1226 having a central hole 1228 for alignment with the hitch insertion member bottom hinge hole 1214. The central hinge assembly 1218 may also have a stop wall 1230 attached to the bottom hinge plate 1226 to establish a maximum angle the support arm longitudinal axis 1202 can rotate in relation to the hitch insertion member longitudinal axis 1204. Optionally, a second stop wall (not shown) could also be used. For example, a first stop wall could limit the extent of swing of the support arm 1236 in a first direction, and a second stop wall could limit the extent of swing of the support arm 1236 in a second direction. The central hinge assembly 1218 also includes a back wall 1234 connected to the top hinge plate 1220 and the bottom hinge plate 1226. The back wall 1234 is attached to the support arm 1236. The central hinge assembly 1218 also includes a central hinge bar 1238 inserted through the central hole 1222 in the top hinge plate 1220 in the central hinge assembly 1218, the hitch insertion member top hinge hole 1210, the hitch insertion member bottom hinge hole 1214, and the central hole 1228 in the bottom hinge plate 1226 of the central hinge assembly 1218, to attach the support arm 1236 to the hitch insertion member 1206, and to permit the support arm 1236 to rotate in relation to the hitch insertion member 1206. The central hinge assembly 1218 may also have a central angle locking bar 1240 inserted into one of the plurality of locking holes 1224 in the top hinge plate 1220 of the central hinge assembly 1218 and into the angle securing hole 1216 in the hitch insertion member 1206, to lock the support arm longitudinal axis 1202 at an angle in relation to the hitch insertion member longitudinal axis 1204 selected from a plurality of angles determined by the locations of the locking holes 1224 in the top hinge plate 1220 of the central hinge assembly 1218 and by the location of the angle securing hole 1216 in the hitch insertion member 1206. The central angle locking bar 1240 may be in a self contained, spring loaded bar housing (not shown), which contains the bar to prevent the bar from being lost. The bar housing may be tack welded to the top hinge plate 1220. Alternatively, the primary central angle locking bar 1240 is not in a bar housing.

F. Secondary Swing Arm

Figure 13:
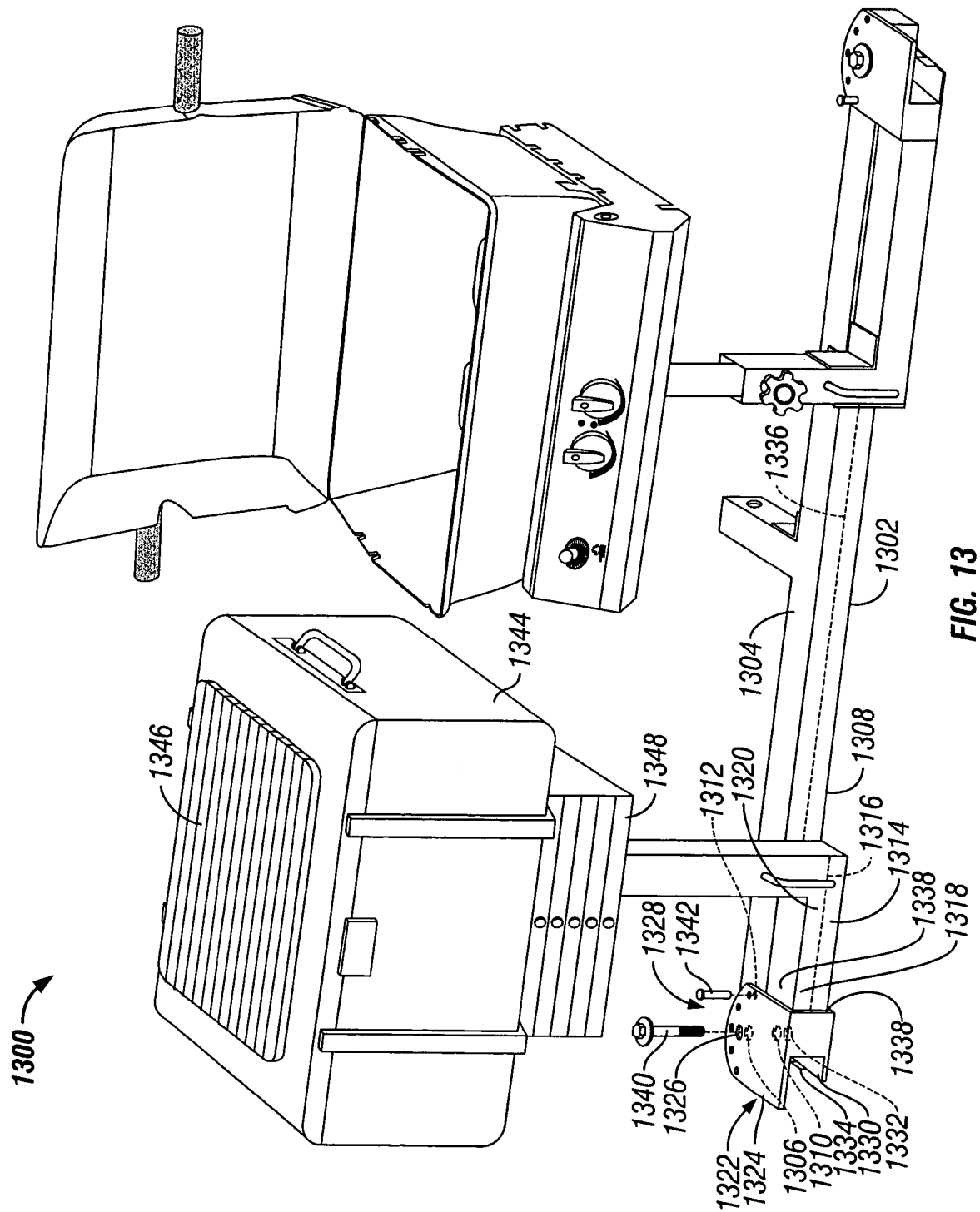
FIG. 13 is a partially exploded perspective view of another example of an apparatus in accordance with an illustrative embodiment of the invention.

Another example of the invention may be embodied by the apparatus 1300 shown in FIG. 13. The apparatus 1300 generally has the features of the apparatus 100, and also has the following additional components and features. The support arm 1302 in the apparatus 1300 may be longer than the support arm 322 in the apparatus 100. In the apparatus 1300, the support arm top 1304 has a support arm top secondary hinge hole 1306, and the support arm bottom 1308 also has a support arm bottom secondary hinge hole 1310 that is aligned with the support arm top secondary hinge hole 1306. The support arm top 1304 may also has a support arm secondary angle securing hole 1312.

The apparatus 1300 also includes a secondary swing arm 1314 defining a secondary swing arm longitudinal axis 1316, and having a secondary swing arm hinged end 1318 and a secondary swing arm swinging end 1320. The apparatus 1300 further includes a secondary hinge assembly 1322. However, any type of hinge, pivot, or other suitable apparatus for pivotally attaching the secondary swing arm 1314 to the support arm 1302 could be used. The secondary hinge assembly 1322 has a top hinge plate 1324 having a central hole 1326 for alignment with the support arm top secondary hinge hole 1306. The top hinge plate 1324 may also have a plurality of locking holes 1328 for selective alignment with the support arm secondary angle securing hole 1312. The secondary hinge assembly 1322 also has a bottom hinge plate 1330 having a central hole 1332 for alignment with the support arm bottom secondary hinge hole 1310. The secondary hinge assembly 1322 may also have a stop wall 1334 attached to the bottom hinge plate 1330 to establish the maximum angle the secondary swing arm longitudinal axis 1316 can rotate in relation to the support arm longitudinal axis 1336. The secondary hinge assembly 1322 also includes an attachment wall 1338 connected to the top hinge plate 1324 and the bottom hinge plate 1330. The attachment wall 1338 is attached to the secondary swing arm 1314. The secondary hinge assembly 1322 also includes a secondary hinge bar 1340 inserted through the central hole 1326 in the top hinge plate 1324 in the secondary hinge assembly 1322, the support arm top secondary hinge hole 1306, the support arm bottom secondary hinge hole 1310, and the central hole 1332 in the bottom hinge plate 1330 of the secondary hinge assembly 1322, to attach the secondary swing arm 1314 to the support arm 1302, and to permit the secondary swing arm 1314 to rotate in relation to the support arm 1302. The secondary hinge assembly 1322 may also have a secondary angle locking bar 1342 inserted into one of the plurality of locking holes 1328 in the top hinge plate 1324 of the secondary hinge assembly 1322 and into the secondary angle securing hole 1312 in the support arm 1302, to lock the secondary swing arm longitudinal axis 1316 at an angle in relation to the support arm longitudinal axis 1336 selected from a plurality of angles determined by the locations of the locking holes 1328 in the top hinge plate 1324 of the secondary hinge assembly 1322 and by the location of the secondary angle securing hole 1312 in the support arm 1302. The secondary angle locking bar 1342 may be in a self contained, spring loaded bar housing (not shown), which contains the bar to prevent the bar from being lost. The bar housing may be tack welded to the top hinge plate 1324. Alternatively, the secondary angle locking bar 1342 is not in a bar housing.

In the illustrated example, a secondary pedestal 1343 is attached to the secondary swing arm 1314. Optionally, the secondary pedestal 1343 can have front and back holes for securing the secondary swing arm 1314 to a securing wall (not shown) with a secondary locking bar 1345. Optionally, one or more additional items may be permanently or removably attached to the secondary pedestal 1343 and/or the secondary swing arm 1314. Optionally, the secondary pedestal 1343 is not included and one or more of the additional items is attached directly to the secondary swing arm 1314. These additional items could include one or more coolers 1344 (ice chests), refrigerators, cutting surfaces 1346 (for example cutting boards), condiment trays, and compartments or drawers 1348 for storing cooking utensils, grill covers, lights (for example, for night barbequing), side-auxiliary grills (auxiliary burners), and/or additional cooking devices.

G. Height Locking Bar

Figure 14:
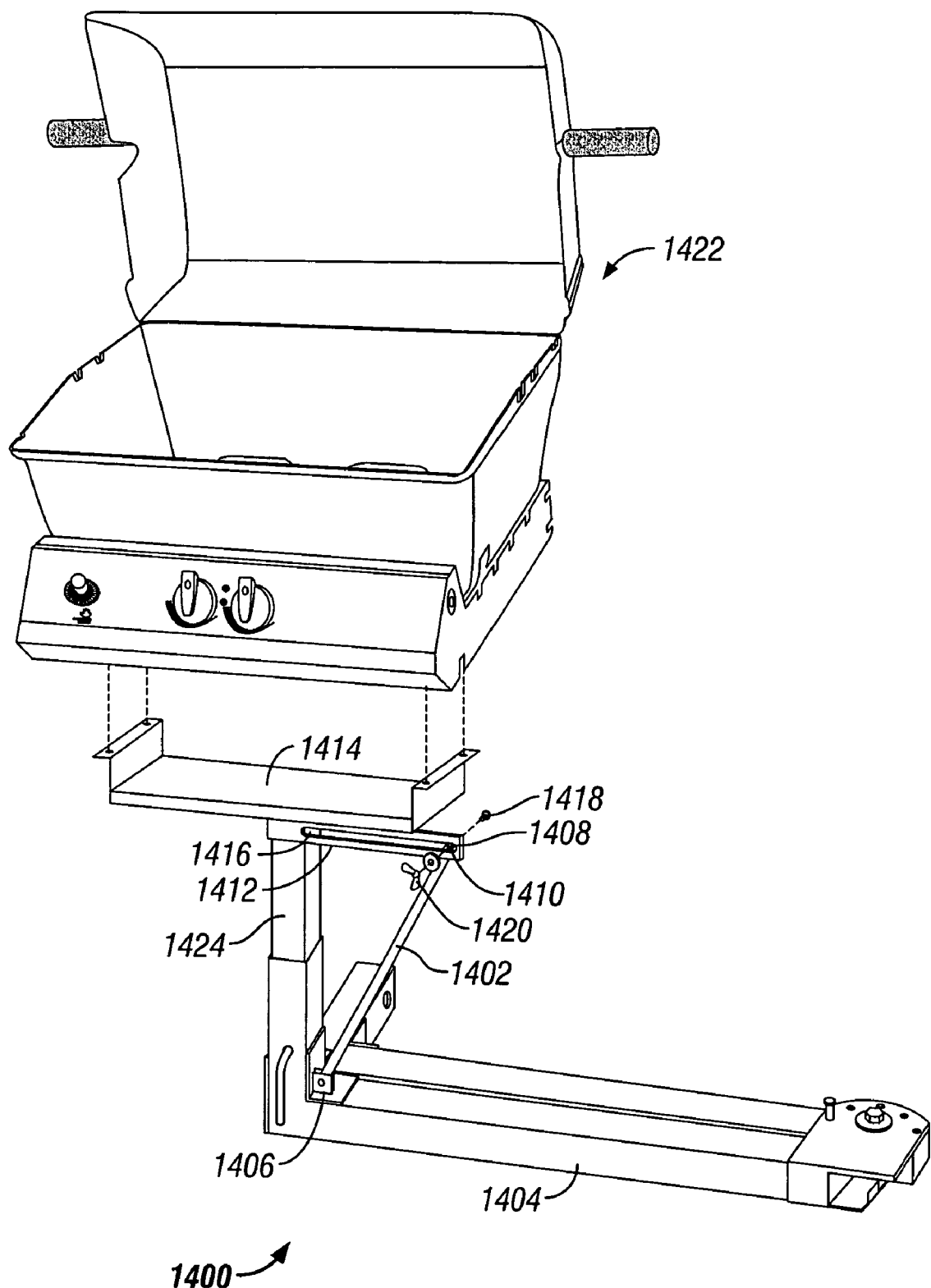
FIG. 14 is a partially exploded perspective view of another example of an apparatus in accordance with an illustrative embodiment of the invention.

Another example of the invention embodied by the apparatus 1400 is illustrated in FIG. 14. The apparatus 1400 includes a height locking bar 1402 pivotally connected to the swing arm 1404 with a pivot assembly 1406, wherein the height locking bar 1402 has a movable end 1408 that has a hole 1410. The apparatus 1400 also has a ledge 1412 attached to the lateral member 1414, wherein the ledge 1412 has a lateral slit 1416. The apparatus 1400 also has a height locking bolt 1418 inserted through the hole 1410 in the movable end 1408 of the height locking bar 1402 and through the lateral slit 1416 in the ledge 1412 of the lateral member 1414. The apparatus 1400 also has a wingnut 1420 attached to the height locking bolt 1418, for securing the movable end 1408 of the height locking bar 1402 to the ledge 1412, to lock the cooking device 1422 at a desired height. Optionally, the height locking bar 1402 could have two telescoping portions, and a locking rod for locking the telescoping portions so that the height locking bar 1402 could be locked at different lengths. Optionally, one or more additional height locking bars, height locking bolts, and wingnuts could be used, and one or more additional ledges and lateral slits could be used (or the ledge 1412 and the lateral slit 1416 could be extended). Optionally, as illustrated in FIG. 14, in the apparatus 1400 the column 1424 may have a square cross section rather than a circular cross section (although a circular cross section could be used). Also, the apparatus 1400 may not include a column rotation locking bar 388 or a rotation adjustment locking hole 382.

H. Hitch Collar, Ground Support Post, and Additional Embodiments

Figure 16:
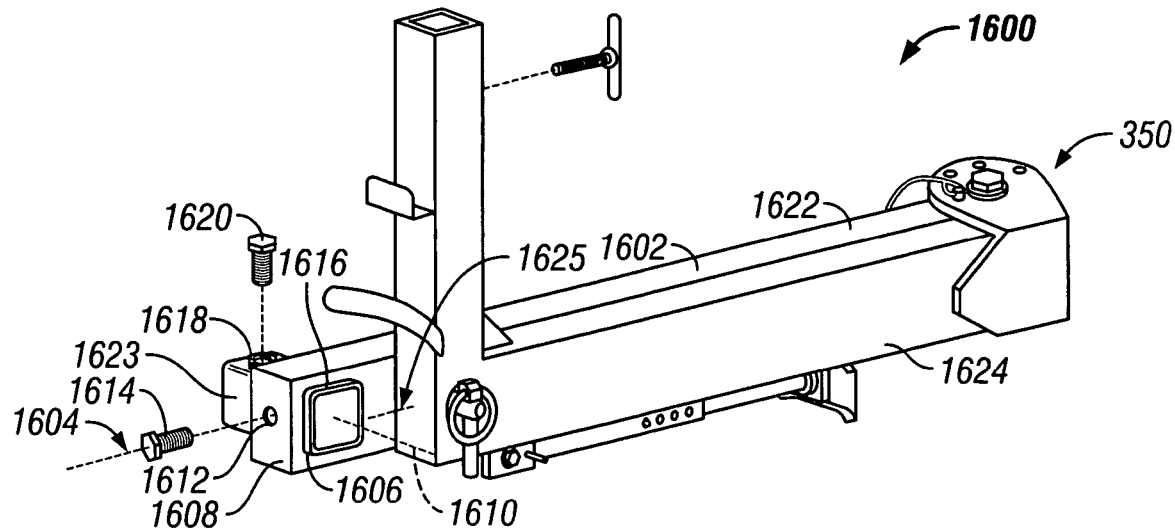
FIG. 16 is a partially exploded perspective view of an example of an apparatus in accordance with an illustrative embodiment of the invention.

An example of the invention shown in FIG. 16, is an apparatus 1600 selectively attachable to a vehicle, for transporting a device and positioning the device in an orientation that permits access to the vehicle. The apparatus may include a support arm 1602 defining a support arm longitudinal axis 1604, wherein the support arm has a hitch collar hole 1606. The hitch collar hole 1606 may be located proximate a first end 1608 of the support arm 1602, but could be located in other locations. As an example, the hitch collar hole 1606 is rectangular, (and may be square). However, the hitch collar hole 1606 could have any desired shape, and could be a square, circle, triangle, pentagon, hexagon, or any other suitable shape. The hitch collar hole 1606 may define a hitch collar hole longitudinal axis 1610, and the hitch collar hole longitudinal axis 1610 may be substantially perpendicular to the support arm longitudinal axis 1604. The support arm 1602 may have a first set screw hole 1612, which may be threaded. Further, a first set screw 1614 may be attached to the first set screw hole 1612.

The apparatus 1600 may further comprise a hitch collar 1616 inserted into the hitch collar hole 1606 in the support arm 1602 and attached to the support arm 1602. If a hitch collar 1616 is included, then the first set screw hole 1612 may extend through both the support arm 1602 and the hitch collar 1616. The hitch collar 1616 may have a second set screw hole 1618, which may be threaded, and a second set screw 1620 may be attached to the second set screw hole 1618. Alternatively, the second set screw hole 1618 could be located in the support arm 1602, for example on a top 1622 of the support arm 1602 (and could also extend through the hitch collar 1616), and the second set screw 1620 could be attached to the second screw hole in the support arm 1602. Alternatively, the first set screw hole could be located in the hitch collar 1616, (and not in the support arm 1602), for example in a portion 1623 of the hitch collar 1616 that protrudes behind the support arm 1602, and the first set screw 1614 could be attached to the first screw hole in the hitch collar 1616. In another alternative embodiment, one or more additional set screw holes could be provided in the support arm 1602 and/or the hitch collar 1616, and additional set screws could also be provided to be attached to the additional set screw holes. The apparatus 1600 may also include a primary swing arm 1624 (having a longitudinal axis 1625), and a primary hinge assembly 350 for swingably attaching the primary swing arm 1624 to the support arm 1602.

Figure 17:
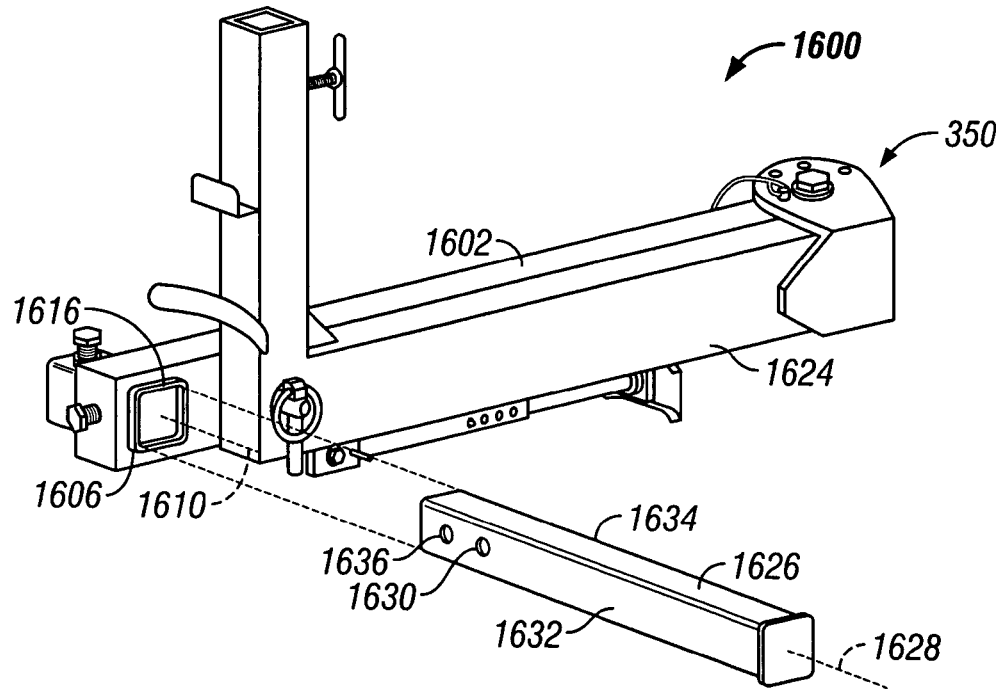
FIG. 17 is a partially exploded perspective view of an example of an apparatus in accordance with an illustrative embodiment of the invention.

Referring to FIG. 17, the apparatus 1600 may also include a collar insertion member 1626, which may be inserted into the hitch collar 1616. The shape of a cross section of the collar insertion member 1626 perpendicular to a longitudinal axis 1628 of the collar insertion member 1626, may be the same as the cross sectional shape of the hitch collar 1616 perpendicular to the longitudinal axis 1610 of the hitch collar 1616, which for example, may be rectangular (and more specifically, may be square). However, cross sections of the collar insertion member 1626 and/or the hitch collar 1616 could have any shapes that permit inserting the collar insertion member 1626 into the hitch collar 1616, and securing the collar insertion member 1626 to the hitch collar 1616, and need not be the same. For example, the shape of a cross section of the collar insertion member 1626 and or the hitch collar 1616 could be a square, circle, triangle, pentagon, hexagon, or any other suitable shape. In embodiments that do not include a hitch collar 1616, the support arm 1602 could be attached directly to the collar insertion member 1626 (for example, by tightening one or more set screws), and the cross section of the collar insertion member 1626 could have any shape that permits inserting the collar insertion member 1626 into the hitch collar hole 1606 in the support arm 1602, and that also permits insertion into the trailer hitch 102 (shown in FIGS. 1 and 2) attached to the vehicle 104 (shown in FIGS. 1 and 2), and securing the collar insertion member 1626 to the trailer hitch 102. For example, a cross section of the collar insertion member 1626 could be a rectangle, square, circle, triangle, pentagon, hexagon, or any other suitable shape. The collar insertion member 1626 may be shaped to be insertable into any sized or shaped vehicle trailer hitch. In an alternative embodiment, if the openings in the hitch collar 1616 and the trailer hitch 102 do not have the same cross sectional shape and size, then the collar insertion member 1626 could have two (or more) cross sectional shapes, wherein a first shape may correspond with the cross sectional shape of the opening in the hitch collar 1616 (or the hitch collar hole 1606 if a hitch collar 1616 is not included), and wherein a second shape may correspond with the shape of the opening in the vehicle trailer hitch (the rearward facing hollow tubular end 108 of the trailer hitch 102), for the portion of the collar insertion member 1626 that may be inserted into the vehicle trailer hitch. Thus, the collar insertion member 1626 may be configured to attach to various types of tubular trailer hitch openings having different sizes and shapes.

Still referring to FIG. 17, the collar insertion member 1626 may have a hole 1630 in a first side 1632 and a corresponding hole (not shown) in a second side 1634 that is opposite the first side 1634, to permit inserting a hitch locking pin 112 (shown in FIG. 2) through the hole 1630 and the corresponding hole in the second side 1634 of the collar insertion member 1626, and corresponding hole 110 (shown in FIG. 2) in the second side (and the corresponding hole in the first side) of the trailer hitch 102, to secure the collar insertion member 1626 to the vehicle 104 trailer hitch 102. The collar insertion member 1626 may also have a second hole 1636 in the first side 1632, and a corresponding hole (not shown) in the second side 1634 of the collar insertion member 1626, to permit selectively inserting the hitch locking pin 112 through either the hole 1630 or the hole 1636, to selectively determine the length of the portion of the collar insertion member 1626 that protrudes from the trailer hitch 102. In embodiments that do not have a hitch collar 1616, the hitch collar hole may be formed so that the edges of the hitch collar hole 1606 contact the collar insertion member 1626, when the collar insertion member 1626 is inserted into the hitch collar hole 1606. The first set screw 1614 and/or the second set screw 1620 may be tightened to contact and push against the collar insertion member 1626 to secure the collar insertion member 1626 to the hitch collar 1616.

Figure 18:
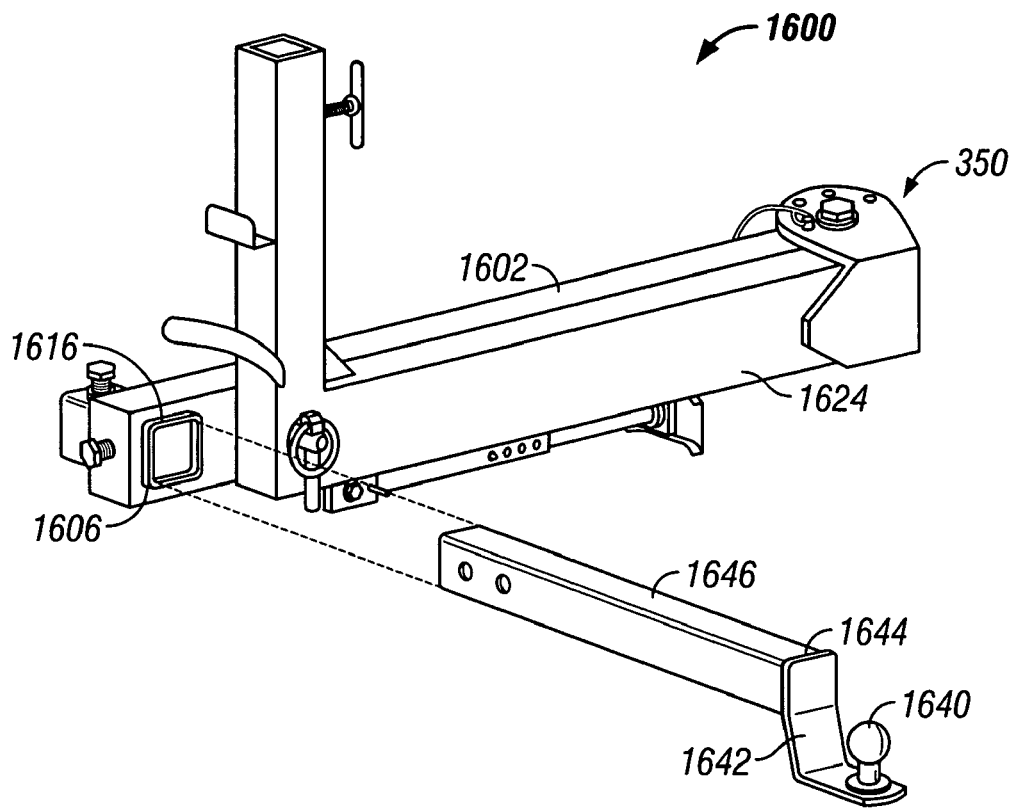
FIG. 18 is a partially exploded perspective view of an example of an apparatus in accordance with an illustrative embodiment of the invention.

Referring to FIG. 18, although not required, in another embodiment of a collar insertion member 1646, a hitch ball 1640 may be attached to a hitch ball mount 1642 that is attached to the end 1644 of the collar insertion member 1646. Thus, the collar insertion member 1646 includes the hitch ball 1640 and the hitch ball mount 1642. Accordingly, some embodiments permit attaching a trailer hitch ball 1640 to the trailer hitch 102 of the vehicle 104 while using the apparatus 1600, which permits towing an object such as a boat or a trailer, while the apparatus 1600 is attached to the vehicle 104. The collar insertion member 1646 may be a standard trailer hitch ball apparatus commonly used with vehicle trailer hitches, or may be custom designed. The collar insertion member 1646 generally has the characteristics and features of the collar insertion member 1626 (in addition to having a hitch ball mount 1642 and a hitch ball 1640). A collar insertion member 1626 or a collar insertion member 1646 may interchangeably be used with the apparatus 1600.

Figure 19:
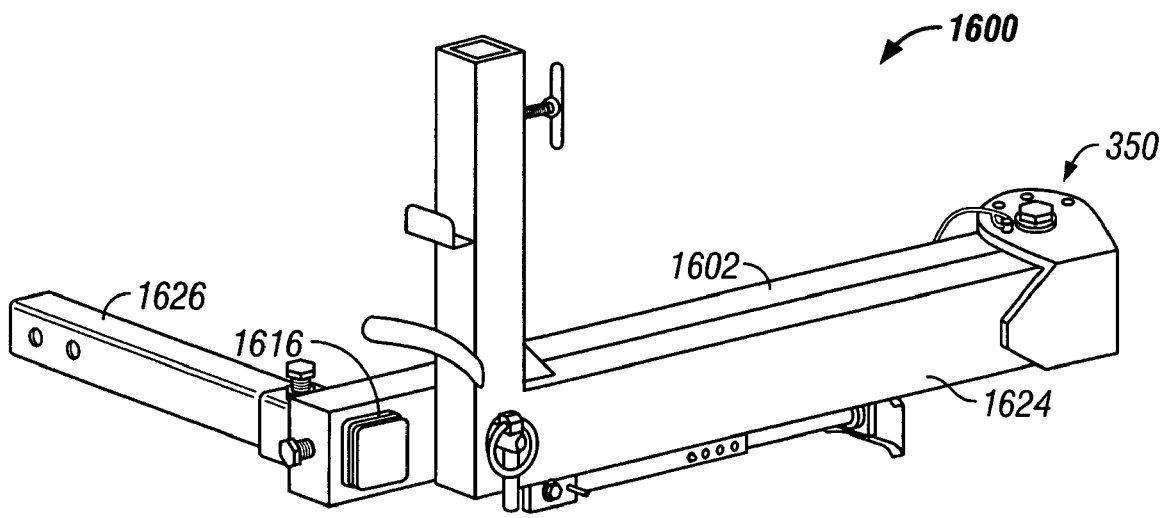
FIG. 19 is a perspective view of an example of an apparatus in accordance with an illustrative embodiment of the invention.

Referring to FIG. 19, the apparatus 1600 is shown with the collar insertion member 1626 fully inserted into the hitch collar 1616.

Figure 20:
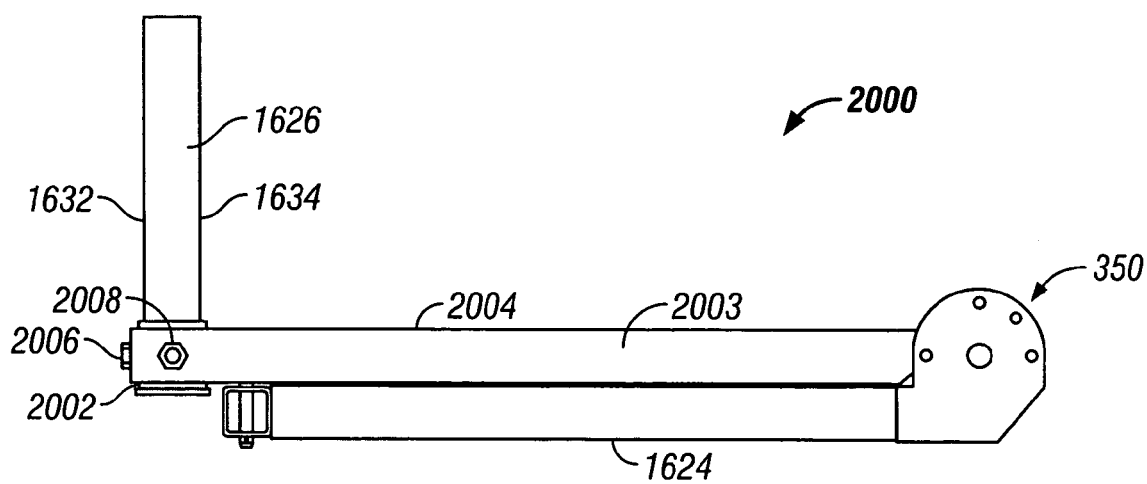
FIG. 20 is a top view of an example of an apparatus in accordance with an illustrative embodiment of the invention.

FIG. 20 is a top view of an alternative embodiment of the apparatus 2000, wherein the hitch collar 2002 does not have a portion 1623 (shown in FIG. 16) protruding behind the support arm 2003, but instead ends immediately behind the back side 2004 of the support arm 2003. In this embodiment both the first set screw 2006 and the second set screw 2008 are located so as to be inserted into holes (not shown) in the support arm 2003, and into holes (not shown) in the hitch collar 2002 beneath the holes in the support arm 2003. Besides these differences, the apparatus 2000 generally may have the elements and characteristics of the apparatus 1600. In FIG. 20, the collar insertion member 1626 is shown fully inserted in to the hitch collar 2002.

Figure 21:
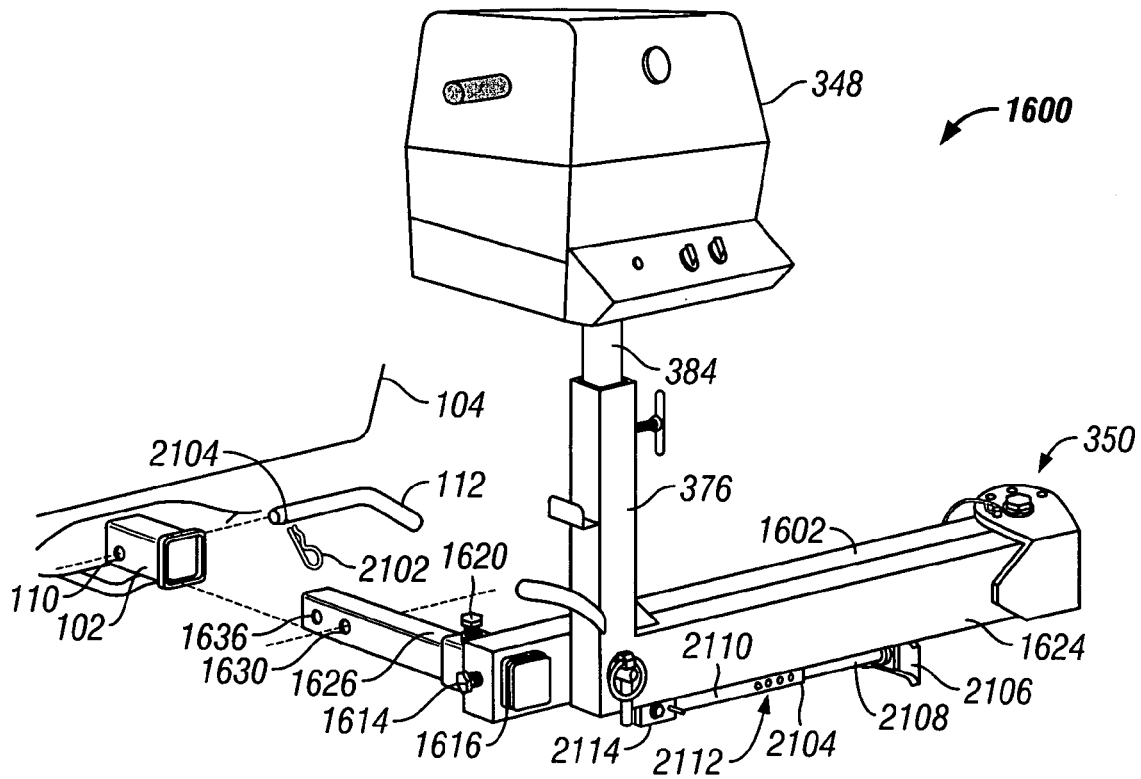
FIG. 21 is a perspective view of an example of an apparatus in accordance with an illustrative embodiment of the invention.

Referring to FIG. 21, the apparatus 1600 is shown adjacent a vehicle 104 that is attached to a trailer hitch 102. As discussed above, a hitch locking pin 112 is shown for insertion into hole 1630 or hole 1636 (and through the corresponding hole on the second side 1634) of the in the collar insertion member 1626, and through the hole 110 in the trailer hitch 102 (and the corresponding hole on the opposite side of the trailer hitch 102) to secure the apparatus 1600 to the trailer hitch 102. A locking pin clip 2102 may be inserted into a hole 2104 in the hitch locking pin 112, to secure the hitch locking pin 112 to the trailer hitch 102. A pedestal 376 is attached to the primary swing arm 1624, and a column 384 is inserted into the pedestal 376. A cooking device is attached to the column 384 (either directly or as described in other sections herein). However, a device other than a cooking device could be attached.

Still referring to FIG. 21, the apparatus 1600 may also include a ground support post 2104, which may be attached to the primary swing arm 1624. A base 2106 may be attached to the ground support post 2104. The ground support post 2104 may be one piece, or as shown, may have a telescoping end portion 2108 inserted into a base portion 2110, for adjusting the length of the ground support post 2104. In one example, holes 2112 may be provided in the ground support post 2104 for inserting one or more bolts or pins for locking the length of the ground support post 2104. When extended to come in contact with the ground, the ground support post 2104 helps support the weight of the apparatus 1600 and any attached device. As shown in the embodiment illustrated in FIG. 21, a ground support post hinge 2114 may be attached to the primary swing arm 1624, and the ground support post 2104 may be attached to the ground support post hinge 2114, to permit swinging the ground support post 2104 from a first position near the primary swing arm 1624, to a second position wherein an end (which may be the base 2106) of the ground support post 2104 is in contact with the ground. In other embodiments (not shown), a ground support post hinge 2114 is not provided, and the ground support post 2104 may be slidably attached to the apparatus 1624 for vertical movement from a first position wherein the ground support post 2104 is adjacent the apparatus 1600, to a second position wherein an end (the base 2106) of the ground support post 2104 is in contact with the ground. A ground support post retaining clip (not shown) may be attached to the primary swing arm 1624, for securing the ground support post 2104 in the first position, retracted near the primary swing arm 1624. Additionally or instead of providing a ground support post retaining clip, a spring (not shown) may be attached to the ground support post 2104 and to the primary swing arm 1624 (or the ground support post hinge 2114), for holding the ground support post in the first position near the primary swing arm 1624. The ground support post 2104 (with or without the base 2106) and the ground support post hinge 2114 together may be called a kickstand. The ground support post 2104 (and any of the associated elements discussed herein) may also be included in any of the other embodiments of the invention discussed in any section herein.

Figure 22:
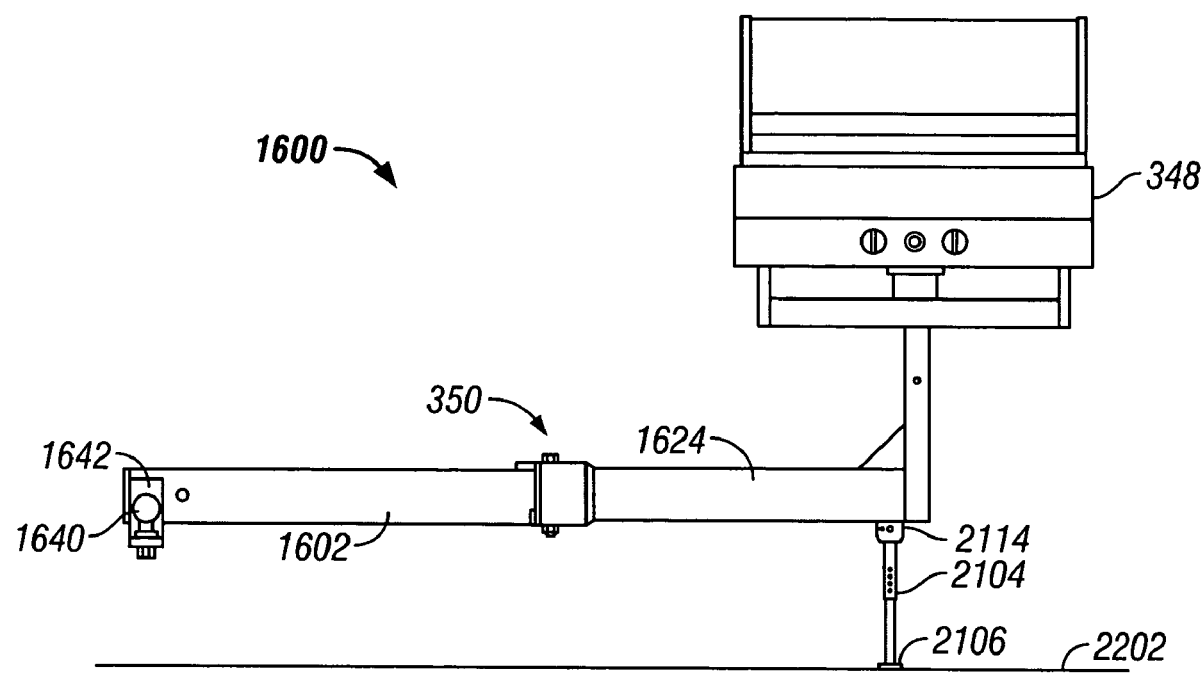
FIG. 22 is a front view of an example of an apparatus in accordance with an illustrative embodiment of the invention.

Referring to FIG. 22, the appatatus 1600 is shown with the primary swing arm 1624 in an extended position, and with the ground support post 2104 extended and in contact with the ground 2202. In FIG. 22, a hitch ball 1640 is attached to a hitch ball mount 1642, which are part of the collar insertion member.

Figure 23:
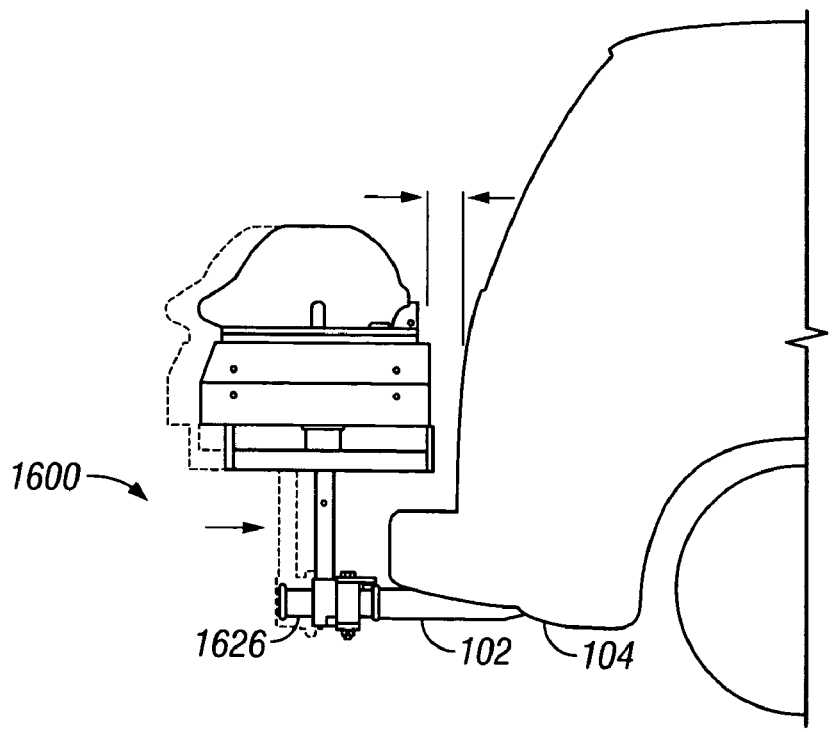
FIG. 23 is a side view of an example of an apparatus in accordance with an illustrative embodiment of the invention.

Referring to FIGS. 21 and 23, the position of the hitch collar 1616 on the collar insertion member 1626 may be adjusted to locate the apparatus 1600 (or 2000) at a desired distance from the vehicle 104, to accommodate attaching different sized devices to the apparatus. Thus, the support arm 1602 may be positioned at a desired distance from the vehicle 104, selected from a range of distances determined by the length of the collar insertion member 1626, (and by which hole 1630 or 1636 is used to secure the collar insertion member 1626 to the trailer hitch 102), and may be secured in the desired position by tightening the set screws 1614, 1620.

The primary swing arm 1624 discussed in this section (with regard to the apparatus 1600, 2000) may be the same as the primary swing arm 340 discussed in other sections herein, except that the primary swing arm 1624 may be shorter to permit the hitch ball mount 1642 and the hitch ball 1640 to protrude from the apparatus 1600 without being hit by the primary swing arm 1624, and to permit the collar insertion member 1626 to protrude from the apparatus 1600 without being hit by the primary swing arm 1624 in embodiments where the collar insertion member 1626 also protrudes. Thus, a length of the support arm 1602 parallel to the support arm longitudinal axis 1604 may be greater than a length of the primary swing arm 1624 parallel to the primary swing arm longitudinal axis 1625. The primary hinge assembly 350 discussed in this section may be the same as the primary hinge assembly 350 described in other sections herein. Similarly, the pedestal 376 and the column 384 discussed in this section may be the same as the pedestal 376 and the column 384 discussed in other sections herein. The apparatus 1600 or 2000, may generally have any of the elements, features, and characteristics discussed in other sections herein for other embodiments. For any embodiment discussed herein, the device may be any transportable device of suitable size and weight, and may be for example, a cooking device, a bicycle (or bicycles), skis, luggage, a wheelchair, a container, or a tank (for storing a gas or a liquid). These devices may be attached to the apparatus using any suitable method of attachment, and need not be attached to a column and/or pedestal.

II. Operation

Figure 15:
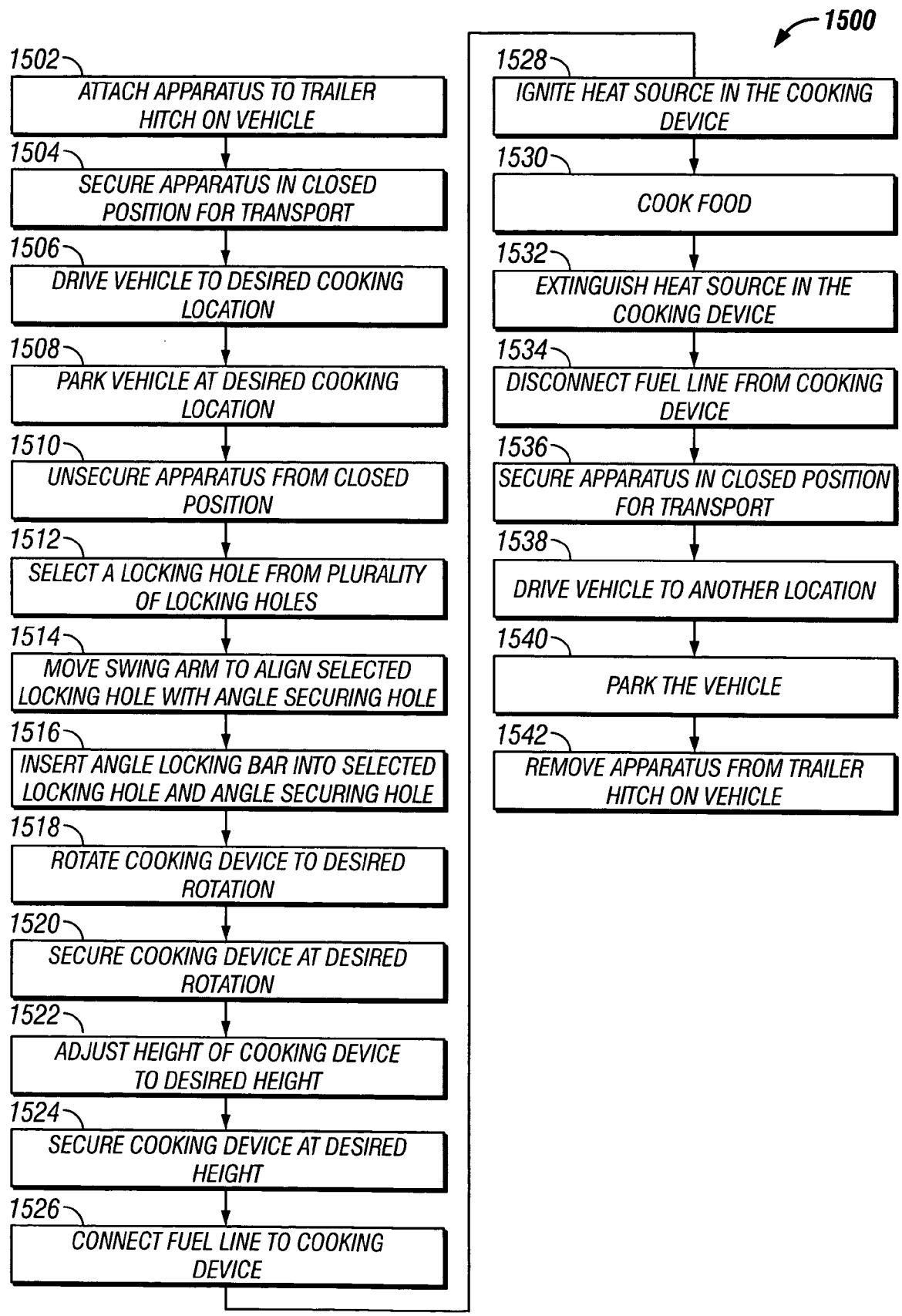
FIG. 15 is a flowchart of an operational sequence for using an apparatus in accordance with an illustrative embodiment of the invention.

In addition to the various hardware embodiments described above, a different aspect of the invention concerns a method for using an apparatus that temporarily attaches to a vehicle, for transporting a cooking device 348 and positioning the cooking device 348 in an orientation for cooking that permits access to the vehicle. FIG. 15 shows a sequence 1500 for an exemplary method for using the apparatus. However, other methods of using the apparatus could be used. For ease of explanation, but without any intended limitation, the example of FIG. 15 is described in the context of the apparatus 100 described above in FIGS. 1-4.

The sequence 1500 begins with task 1502 in which the apparatus is attached to the trailer hitch 102 on the vehicle 104. In task 1504, the user secures the apparatus in a closed position for safe transport for driving the vehicle 104. The apparatus 100 may be secured by orienting the primary swing arm 340 in a closed position next to the support arm 322, and then inserting the primary angle locking bar 368 into the primary angle securing hole 338 and also into the locking hole from the plurality of locking holes 356 in the top hinge plate 352 of the primary hinge assembly 350 that is lined up with the support arm primary angle securing hole 338 when the primary swing arm 340 is in a closed position next to the support arm 322. Alternatively, or in addition to using the primary angle locking bar 368 to secure the apparatus 100, the apparatus 100 may be secured by orienting the primary swing arm 340 in a closed position next to the support arm 322, and then inserting the locking bar 438 into the securing wall hole 436, the pedestal back securing hole 428, the column back securing hole 432, the column front securing hole 430, and the pedestal front securing hole 426, and securing the locking bar in place, for example with a locking pin or a lock. In task 1506, the user drives the vehicle 104 to a desired cooking location. The user then parks the vehicle 104 at the desired cooking location in task 1508. In task 1510, the user unsecures the apparatus 100 from the closed position, while leaving the apparatus 100 connected to the trailer hitch 102 on the vehicle 104. The apparatus 100 is unsecured by removing the primary angle locking bar 368, and/or by removing the locking bar 438. Next, in task 1512, the user selects a locking hole from a plurality of locking holes 356 on the primary hinge assembly 350, to line up with the angle securing hole 338 on the support arm 322, to establish a desired angle between the support arm longitudinal axis 332 and the primary swing arm longitudinal axis 342, wherein the desired angle is selected from a plurality of angles determined by the locations of the plurality of locking holes 356 and the angle securing hole 338. In task 1514, the user moves the primary swing arm 340, to align the selected locking hole with the angle securing hole 338. Next, in task 1516, the user inserts the primary angle locking bar 368 into the selected locking hole from the plurality of locking holes 356 and into the angle securing hole 338, to lock the primary swing arm longitudinal axis 342 at the desired angle in relation to the support arm longitudinal axis 332. Optionally, in task 1518, the user rotates the cooking device 348 to a desired rotation. Optionally, in task 1520, the user secures the cooking device 348 at the desired rotation. Optionally, in task 1522, the user adjusts the height of cooking device 348 to a desired height. Optionally, in task 1524, the user secures the cooking device 348 at the desired height. If the cooking device 348 is not already connected to a fuel source or does not already have a fuel source, then in task 1526, the user connects a fuel line connected to a fuel source to the cooking device 348. In task 1528 the user ignites a heat source in the cooking device 348. The user cooks some food in task 1530. Next, in task 1532, the user extinguishes the heat source in the cooking device 348. Optionally, in task 1534, the user disconnects the fuel line from the cooking device 348. Typically, the fuel line will be disconnected from the cooking device 348 prior to transporting the apparatus 100. However, the fuel line could be left connected if the fuel tank 452 is attached to the apparatus 100 during transport, for example in a fuel tank holder 450. Next, in task 1536, the user secures the apparatus in a closed position for safe transport for driving the vehicle 104, as described above. In task 1538, the user then drives the vehicle 104 to another location. In task 1540, the user parks the vehicle 104. Finally, in task 1542, the user removes the apparatus 100 from the trailer hitch 102 on the vehicle 104.

Alternatively, after parking the vehicle 104 at the location desired for cooking, the user removes the apparatus 100 from the trailer hitch 102 of the vehicle 104 places the apparatus 100 on a carrier stand that is separate from the apparatus 100, optionally connects a fuel line connected to a fuel source to the cooking device 348, ignites the heat source in the cooking device 348, cooks some food, extinguishes the heat source, optionally disconnects the fuel line from the cooking device 348, removes the apparatus 100 from the carrier stand, attaches the apparatus 100 to the trailer hitch 102 on the vehicle 104, secures the apparatus 100 in a closed position for safe transport for driving the vehicle 104, drives the vehicle 104 to another location, parks the vehicle 104, and then removes the apparatus from the trailer hitch 102 on the vehicle 104.

For the embodiments of the apparatus 1600 and 2000 discussed above, the sequence may also include selecting either a collar insertion member 1626 that does not have a hitch ball 1640, or a collar insertion member 1646 that includes a hitch ball 1640 and a hitch ball mount 1642. The sequence may also include inserting the collar insertion member 1626 or 1646 into the hitch collar 1616. The sequence may also include tightening the set screws 1614, 1620 at this point. The sequence may also include inserting the collar insertion member 1626 or 1646 into the rearward facing hollow tubular end of the trailer hitch 108, and may further include aligning either the hole 1630 or the hole 1636 in the collar insertion member 1626 or 1646 with the hole 110 in the trailer hitch 102. The sequence may also include inserting the hitch locking pin 112 through the aligned holes to secure the collar insertion member 1626 or 1646 (and the other portions of the apparatus 1600, 2000) to the trailer hitch 102. The sequence may also include attaching a locking pin clip 2102 to the hitch locking pin 112, to prevent the hitch locking pin 112 from becoming dislodged from the trailer hitch 102. If the set screws 1614, 1620 were previously tightened, the sequence may also include loosening the set screws 1614, 1620 so that, if desired, the sequence may also include moving the hitch collar 1616 in a direction substantially parallel to the longitudinal axis 1628 of the collar insertion member 1626, 1646, to position the support arm 1602, 2003 (and other portions of the apparatus) at a desired distance from the vehicle 104. The sequence may also include tightening the set screws 1614, 1620 after the support arm 1602, 2003 is at a desired distance from the vehicle 104, to secure the hitch collar 1616 to the collar insertion member 1626, 1646. In embodiments in which only one set screw is provided, then in the sequence only the single set screw is tightened (or loosened). In summary, in some embodiments attaching the apparatus to a trailer hitch 102 on the vehicle 104 may include one or more of the operations described in this paragraph.

For ease of explanation, but without any limitation intended limitation, use of the ground support post 2104 is discussed with reference to the apparatus 100, 1600, 2000. However, the ground support post 2104 could be used with other embodiments discussed herein. For any embodiment that includes a ground support post 2104, the sequence may also include moving an end of the ground support post 2104 from a position near the apparatus 100, 1600, 2000, to a position in contact with the ground 2202, after the primary swing arm 340, 1624 is secured at a desired angle in relation to the support arm 322, 1602. Moving the end of the ground support post 2104 from a position near the apparatus 100, 1600, 2000, to a position in contact with the ground 2202, may assist in securing the device at a desired height in some embodiments. To prepare the apparatus 100, 1600, 2000 for transport, the sequence may also include moving the end of the ground support post 2104 from a position in contact with the ground 2202, to a position near the apparatus 100, 1600, 2000. For any embodiment of the invention, the sequence may also include removing the device from the apparatus to permit using the device, and may also include attaching the device to the apparatus when use of the device is completed.

III. Additional Information

Some examples of the invention are described in the following entries:

Entry 1. An apparatus selectively attachable to a vehicle, for transporting a cooking device and positioning the cooking device in an orientation for cooking that permits access to the vehicle, the apparatus comprising:
  a hitch insertion member having a base;
  a support arm having a support arm top and a support arm bottom, and wherein the support arm defines a support arm longitudinal axis, and wherein the support arm top has a support arm top primary hinge hole and the support arm bottom has a support arm bottom primary hinge hole aligned with the support arm top primary hinge hole, and wherein the support arm is attached to the base of the hitch insertion member;
  a primary swing arm defining a primary swing arm longitudinal axis;
  a primary hinge assembly comprising:
    a top hinge plate having a central hole for alignment with the support arm top primary hinge hole;
    a bottom hinge plate having a central hole for alignment with the support arm bottom primary hinge hole; and
    an attachment wall connected to the top hinge plate and the bottom hinge plate, the attachment wall being attached to the primary swing arm;
  a primary hinge bar inserted through the central hole in the top hinge plate in the primary hinge assembly, the support arm top primary hinge hole, the support arm bottom primary hinge hole, and the central hole in the bottom hinge plate of the primary hinge assembly, to attach the primary swing arm to the support arm, and to permit the swing arm to rotate in relation to the support arm;
  a pedestal having a base, wherein the base of the pedestal is attached to the primary swing arm; and
  a column, the column being at least partially inserted into the pedestal.

Entry 2. The apparatus of entry 1:
  wherein the hitch insertion member has a hitch insertion member first side and a hitch insertion member second side, and wherein the hitch insertion member first side has a hole and the hitch insertion member second side has a hole aligned with the hole in the hitch insertion member first side;

wherein the support arm has a support arm primary angle securing hole;

wherein the top hinge plate of the primary hinge assembly has a plurality of locking holes for selective alignment with the support arm angle securing hole;

wherein the primary hinge assembly further comprises a stop wall attached to the bottom hinge plate to establish the maximum angle the longitudinal axis of the primary swing arm can rotate in relation to the longitudinal axis of the support arm;

wherein the pedestal has a rotation adjustment hole;

further comprising a primary angle locking bar inserted into one of the plurality of locking holes in the top hinge plate of the primary hinge assembly and into the primary angle securing hole in the support arm, to lock the longitudinal axis of the primary swing arm at an angle in relation to the longitudinal axis of the support arm selected from a plurality of angles determined by the locations of the locking holes in the top hinge plate of the primary hinge assembly and by the location of the primary angle securing hole in the support arm;

further comprising a column rotation locking bar secured through the pedestal rotation adjustment hole to lock the column at a selected rotation within the pedestal; and a lateral member attached to the column.

Entry 3. The apparatus of entry 2 further comprising a cooking device attached to the lateral member.

Entry 4. The apparatus of entry 3 wherein the cooking device is a barbeque.

Entry 5. The apparatus of entry 4:

wherein the pedestal has a pedestal front securing hole and a pedestal back securing hole, and wherein the pedestal front securing hole and the pedestal back securing hole are on opposite sides of the pedestal and are aligned with each other;

wherein the column has a column front securing hole and a column back securing hole, wherein the column front securing hole and the column back securing hole are on opposite sides of the column and are aligned with each other, and wherein the column front securing hole is located to permit alignment with the pedestal front securing hole and the column back securing hole is located to permit alignment with the pedestal back securing hole when the column is fully inserted into the pedestal; and further comprising:

a securing wall attached to the support arm, the securing wall having a securing wall hole located to align with the pedestal back securing hole when the primary swing arm is adjacent the support arm; and a locking bar for insertion into the pedestal front securing hole, the column front securing hole, the column back securing hole, the pedestal back securing hole, and the securing wall hole, to secure the apparatus for transport.

Entry 6. The apparatus of entry 5:

wherein the central hole in the top hinge plate of the primary hinge assembly is located in an overhang area of the top hinge plate, and wherein the plurality of locking holes in the top hinge plate of the primary hinge assembly are also located in the overhang area of the top hinge plate; and wherein the central hole in the bottom hinge plate of the primary hinge assembly is located in an overhang area of the bottom hinge plate.

Entry 7. The apparatus of entry 6 wherein the bottom hinge plate also has a nonoverhang area, and wherein the stop wall is partially contiguous with the overhang area and the nonoverhang area of the bottom hinge plate.

Entry 8. The apparatus of entry 7 wherein the support arm has a first end, and wherein the support arm top primary hinge hole is located within about 5 centimeters from the second end of the support arm, and wherein the support arm primary angle securing hole is located within about 10 centimeters from the support arm top primary hinge hole.

Entry 9. The apparatus of entry 8:

wherein the hitch insertion member defines a hitch insertion member longitudinal axis, and wherein a cross section of the hitch insertion member perpendicular to the hitch insertion member longitudinal axis is a square;

wherein a cross section of the support arm perpendicular to the support arm longitudinal axis is a rectangle;

wherein a cross section of the primary swing arm perpendicular to the primary swing arm longitudinal axis is a rectangle; and wherein the pedestal defines a pedestal longitudinal axis and wherein a cross section of the pedestal perpendicular to the pedestal longitudinal axis is a square; and wherein the column defines a column longitudinal axis, and wherein a cross section of the column perpendicular to the column longitudinal axis is a circle.

Entry 10. The apparatus of entry 9 further comprising:

a support arm outside gusset attached to the support arm and the hitch insertion member;

a support arm inside gusset attached to the support arm and the hitch insertion member;

an inside pedestal gusset attached to the pedestal and the primary swing arm, the inside pedestal gusset having a threaded hole aligned with the rotation adjustment hole in the pedestal;

an outside pedestal gusset attached to the pedestal and the primary swing arm;

a top hinge hole liner attached to the support arm top primary hinge hole;

a bottom hinge hole liner attached to the support arm bottom primary hinge hole;

a first bracket attached to a first end of the lateral member;

a second bracket attached to a second end of the lateral member;

a plurality of bolts and nuts; and wherein the first bracket has a plurality of holes and the second bracket has a plurality of holes, and the barbeque has a plurality of holes aligned with the plurality of holes in the first bracket and the second bracket, and wherein the barbeque is attached to the first bracket and the second bracket with a bolt from the plurality of bolts inserted through each of the aligned holes in the barbeque and the first bracket, and through each of the aligned holes in the barbeque and the second bracket, with each bolt being secured with a nut from the plurality of nuts; and wherein the lateral member has a lateral member hole, and the column is inserted into the lateral member hole.

Entry 11. The apparatus of entry 4:

wherein the hitch insertion member defines a hitch insertion member longitudinal axis and the pedestal defines a pedestal longitudinal axis;

wherein the support arm has a support arm first end, and wherein the support arm first end is attached to the base of the hitch insertion member with the support arm longitudinal axis substantially perpendicular to the hitch insertion member longitudinal axis; and wherein the primary swing arm has a primary swing arm hinged end and a primary swing arm swinging end, and wherein the attachment wall of the primary hinge assembly is attached to the primary swing arm hinged end, and wherein the base of the pedestal is attached to the primary hinge assembly swinging end, with the pedestal longitudinal axis substantially perpendicular to the longitudinal axis of the primary swing arm.

Entry 12. The apparatus of entry 4, wherein, the support arm longitudinal axis and the swing arm longitudinal axis are substantially parallel and horizontal, when the hitch insertion member is oriented to be inserted into a trailer hitch.

Entry 13. The apparatus of entry 3, wherein the support arm longitudinal axis is substantially parallel to horizontal, and wherein the swing arm longitudinal axis defines an angle alpha from horizontal, when the hitch insertion member is oriented to be inserted into a trailer hitch.

Entry 14. The apparatus of entry 3, wherein the support arm and the primary swing arm are curved.

Entry 15. The apparatus of entry 3, wherein the support arm has at least one additional support arm segment and the primary swing arm has at least one additional swing arm segment.

Entry 16. The apparatus of entry 3, further comprising a hitch vertical member attached to the hitch insertion member and the support arm for attaching the support arm to the hitch insertion member and to locate the support arm and the primary swing arm in a plane that is a specified distance above the trailer hitch.

Entry 17. The apparatus of entry 4 wherein the primary swing arm is above the support arm.

Entry 18. The apparatus of entry 3, further comprising a support vertical member attached to the primary hinge assembly and the primary swing arm to position the primary swing arm a specified distance above the support arm.

Entry 19. The apparatus of entry 3, wherein the primary swing arm comprises a retainer portion and a telescoping insertion portion partially inserted into the retainer portion and secured to the retainer portion, wherein the telescoping insertion portion can be partially extended from within the retainer portion to extend the length of the primary swing arm, and wherein the attachment wall of the primary hinge assembly is attached to the retainer portion, and wherein the base of the pedestal is attached to the telescoping insertion portion.

Entry 20. The apparatus of entry 3, further comprising a supplemental trailer hitch receptacle attached to the apparatus.

Entry 21. The apparatus of entry 20, further comprising trailer hitch ball attached to the supplemental trail hitch receptacle.

Entry 22. The apparatus of entry 4 further comprising a license plate mount and a license plate light attached to the apparatus.

Entry 23. The apparatus of entry 4 further comprising a fuel tank retaining rack attached to the apparatus, for attaching a fuel tank to the apparatus.

Entry 24. The apparatus of entry 4 further comprising a shock dampening device having a shock dampening device first end attached to the hitch insertion member and a shock dampening device second end attached to the lateral member.

Entry 25. The apparatus of entry 3 further comprising:
a height locking bar pivotally connected to the swing arm, the height locking bar having a movable end having a hole;
a ledge attached to the lateral member, the ledge having a lateral slit;
a height locking bolt inserted through the hole in the movable end of the height locking bar and the lateral slit in the ledge of the lateral member; and
a wingnut attached to the height locking bolt, for locking the cooking apparatus at a desired height.

Entry 26. The apparatus of entry 3, wherein the hitch insertion member has a hitch insertion member top and a hitch insertion member bottom, and wherein the hitch insertion member top has a hitch insertion member top hinge hole and the hitch insertion member bottom has a hitch insertion member bottom hinge hole aligned with the hitch insertion member top hinge hole, and wherein the hitch insertion member top has a hitch insertion member angle securing hole; and
further comprising:
a central hinge assembly comprising:
a top hinge plate having a central hole for alignment with the hitch insertion member top hinge hole, the top hinge plate also having a plurality of locking holes for selective alignment with the hitch insertion member locking hole;
a bottom hinge plate having a central hole for alignment with the hitch insertion member bottom hinge hole;
a stop wall attached to the bottom hinge plate to establish a maximum angle the longitudinal axis of the support arm can rotate in relation to the longitudinal axis of the hitch insertion member; and
a back wall connected to the top hinge plate and the bottom hinge plate, the back wall being attached to the support arm;
a central hinge bar inserted through the central hole in the top hinge plate in the central hinge assembly, the hitch insertion member top hinge hole, the hitch insertion member bottom hinge hole, and the central hole in the bottom hinge plate of the central hinge assembly, to attach the support arm to the base of the hitch insertion member, and to permit the support arm to rotate in relation to the hitch insertion member; and
a central angle locking bar inserted into one of the plurality of locking holes in the top hinge plate of the central hinge assembly and into the locking hole in the hitch insertion member, to lock the longitudinal axis of the support arm at an angle in relation to the longitudinal axis of the hitch insertion member selected from a plurality of angles determined by the locations of the locking holes in the top hinge plate of the central hinge assembly and by the location of the angle securing hole in the hitch insertion member.

Entry 27. The apparatus of entry 3:
wherein the support arm has a support arm top secondary hinge hole and the support arm bottom has a support arm bottom secondary hinge hole aligned with the support arm top secondary hinge hole, and wherein the support arm top has a support arm secondary angle securing hole; and
further comprising:
a secondary swing arm defining a secondary swing arm longitudinal axis;
a secondary hinge assembly comprising:
a top hinge plate having a central hole for alignment with the support arm top secondary hinge hole, the top hinge plate also having a plurality of locking holes for selective alignment with the support arm secondary angle securing hole;
a bottom hinge plate having a central hole for alignment with the support arm bottom secondary hinge hole;
a stop wall attached to the bottom hinge plate to establish the maximum angle the longitudinal axis of the secondary swing arm can rotate in relation to the longitudinal axis of the support arm; and an attachment wall connected to the top hinge plate and the bottom hinge plate, the attachment wall being attached to the secondary swing arm;

a secondary hinge bar inserted through the central hole in the top hinge plate in the secondary hinge assembly, the support arm top secondary hinge hole, the support arm bottom secondary hinge hole, and the central hole in the bottom hinge plate of the secondary hinge assembly, to attach the secondary swing arm to the support arm, and to permit the secondary swing arm to rotate in relation to the support arm; and a secondary angle locking bar inserted into one of the plurality of locking holes in the top hinge plate of the secondary hinge assembly and into the secondary angle securing hole in the support arm, to lock the longitudinal axis of the secondary swing arm at an angle in relation to the longitudinal axis of the support arm selected from a plurality of angles determined by the locations of the locking holes in the top hinge plate of the secondary hinge assembly and by the location of the secondary angle securing hole in the support arm.

Entry 28. An apparatus selectively attachable to a vehicle, for transporting a cooking device and positioning the cooking device in an orientation for cooking that permits access to the vehicle, the apparatus comprising:

means for connecting the apparatus to a trailer hitch on a vehicle;

a support arm defining a support arm longitudinal axis, wherein the support arm is attached to the means for connecting the apparatus to a trailer hitch;

a primary swing arm defining a primary swing arm longitudinal axis;

means for pivotally attaching the primary swing arm to the support arm;

means for locking the longitudinal axis of the primary swing arm at an angle in relation to the longitudinal axis of the support arm selected from a plurality of angles determined by the locations of a plurality of locking holes and an angle securing hole;

means for attaching the cooking device to the primary swing arm;

means for rotating the cooking device;

means for adjusting the height of the cooking device; and means for securing the apparatus for safe transport while driving the vehicle.

Entry 29. A method for using an apparatus that temporarily attaches to a vehicle, for transporting a cooking device and positioning the cooking device in an orientation for cooking that permits access to the vehicle, the method comprising:

attaching the apparatus to a trailer hitch on a vehicle;

securing the apparatus in a closed position for safe transport for driving the vehicle;

driving the vehicle to a desired cooking location; parking the vehicle at the desired cooking location;

unsecuring the apparatus from the closed position, while leaving the apparatus connected to the trailer hitch on the vehicle;

selecting a locking hole from a plurality of locking holes, to line up with an angle securing hole, to establish a desired angle between a support arm longitudinal axis and a swing arm longitudinal axis, wherein the desired angle is selected from a plurality of angles determined by the locations of the plurality of locking holes and the angle securing hole;

moving the swing arm to align the selected locking hole with the angle securing hole;

inserting an angle locking bar into the selected locking hole and into the angle securing hole, to lock the swing arm longitudinal axis at the desired angle in relation to the support arm longitudinal axis;

rotating the cooking device to a desired rotation;

securing the cooking device at the desired rotation;

igniting a heat source in the cooking device;

cooking some food;

extinguishing the heat source in the cooking device;

securing the apparatus in a closed position for safe transport for driving the vehicle;

driving the vehicle to another location;

parking the vehicle; and removing the apparatus from the trailer hitch on the vehicle.

Entry 30. The method of entry 29 further comprising:

adjusting height of cooking device to a desired height; and securing the cooking device at the desired height.

Entry 31. The method of entry 29 further comprising:

connecting a fuel line connected to a fuel source to the cooking device, before igniting the heat source in the cooking device; and disconnecting the fuel line from the cooking device, after extinguishing the heat source in the cooking device.

Some examples of the invention may be summarized as follows:

One aspect of the present invention concerns a portable apparatus that is selectively attachable to a vehicle, for transporting a cooking device and positioning the cooking device in an orientation for cooking that permits access to the vehicle.

In one example of the invention, the apparatus includes a hitch insertion member, a support arm that is attached to the hitch insertion member, a swing arm that is attached to the support arm with a hinge, a pedestal attached to the swing arm, and a cooking device that is attached to a column that is inserted into the pedestal. As an example, the cooking device may be a propane fueled barbeque.

The hitch insertion member is shaped for insertion into a trailer hitch attached to a vehicle. The hitch insertion member has a hole in a first side, and a hole in a second side aligned with the hole in the first side, for securing the hitch insertion member to the trailer hitch. As an example, the hitch insertion member is inserted into the trailer hitch and is secured to the trailer hitch in a user's garage prior to driving to a sporting event for a tailgate barbeque party.

The support arm is attached to a base of the hitch insertion member. The support arm has a support arm top hinge hole, and a support arm bottom hinge hole that is aligned with the support arm top hinge hole. The support arm top also has a support arm angle securing hole.

The swing arm is attached to a locking hinge assembly. The locking hinge assembly has a top hinge plate that has a central hole that is aligned with the support arm top hinge hole. The top hinge plate also has a plurality of locking holes for selective alignment with the support arm angle securing hole. The locking hinge assembly also has a bottom hinge plate that has a central hole that is aligned with the support arm bottom hinge hole. The locking hinge assembly also has a stop wall attached to the bottom hinge plate to establish the maximum angle the swing arm can rotate in relation to the longitudinal axis of the support arm. The locking hinge assembly also includes a hinge bar that is inserted through the central hole in the top hinge plate in the locking hinge assembly, the support arm top hinge hole, the support arm bottom hinge hole, and the central hole in the bottom hinge plate of the locking hinge assembly, to attach the swing arm to the support arm, and to permit the swing arm to rotate in relation to the support arm.

The locking hinge assembly further includes an angle locking bar, that the user inserts into one of the plurality of locking holes in the top hinge plate and into the angle securing hole in the support arm, to lock the longitudinal axis of the swing arm at a selected angle in relation to the longitudinal axis of the support arm. The selected angle is determined by the location of the locking hole in the plurality of locking holes in the top hinge plate that the user chooses to align with the angle securing hole in the support arm.

Prior to driving the vehicle that the apparatus is attached to, the user swings the swing arm into a closed position next to the support arm, which causes one of the locking holes in the top hinge plate to become aligned with the angle securing hole in the support arm. The user then places the angle locking bar into the aligned holes to lock the swing arm in the closed position next to the support arm.

After the user parks the vehicle at the desired cooking location, the user removes the angle locking bar from the angle securing hole in the support arm, and then swings the nonhinged end of the swing arm away from the support arm, to move the cooking device further behind the vehicle, or to the side of the vehicle, to generally position the cooking device in a desired location for cooking, and to permit access to the rear door(s) or hatch of the vehicle. The user can then lock the swing arm to keep the cooking device at the desired location. The swing arm is locked into position by moving the swing arm to align one of the locking holes in the top hinge plate with the angle securing hole in the support arm, and then placing the angle locking bar into the aligned holes. The angle between the longitudinal axis of the support arm and the longitudinal axis of the swing arm is determined by the location of the locking hole in the top hinge plate that is aligned with the angle securing hole.

The column that the cooking device is attached to is inserted into the pedestal that is attached to the swing arm. The column can rotate in the pedestal, which permits the user to rotate the cooking device to a desired rotation. The user may secure the cooking device at the desired rotation by tightening a column rotation locking bar that, when tightened, presses against the column through a hole in the pedestal.

One or more of the following advantages may be provided by one or more examples of the invention. Some examples of the apparatus of the present invention permit swinging the cooking device further behind the vehicle, or to the side of the vehicle, to permit complete accessibility to the vehicle cargo bay via the rear door(s) or the rear hatch of the vehicle, when loading or unloading the vehicle. Some examples of the apparatus also permit moving the cooking device before or during cooking to optimally position the cooking device, for example, with regard to safety or the wind or sun, and the cooking device can be locked at a desired position. Another advantage is that some examples of the apparatus can be quickly moved into position for cooking, and can also be quickly secured for travel. Additionally, the apparatus can easily be temporarily attached to the vehicle prior to driving to an outdoor recreational location, and then can easily be removed from the vehicle when the user returns home. Further, the apparatus need not be stored in the valuable interior cargo area of the vehicle, which leaves that space available for additional passengers or supplies. Also, with regard to fire safety, the contained cooking environment of the cooking device provides a much safer alternative to a campfire. Furthermore, the cooking device provides a clean cooking environment unlike many public barbeques.

IV. Other Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. An apparatus selectively attachable to a vehicle, for transporting a device and positioning the device in an orientation that permits access to the vehicle, the apparatus comprising:
   a support arm defining a support arm longitudinal axis, wherein the support arm has a hitch collar hole;
   a primary swing arm defining a primary swing arm longitudinal axis;
   a primary hinge assembly coupled to the support arm and the primary swing arm;
   a hitch collar inserted into the hitch collar hole in the support arm and attached to the support arm;
   a collar insertion member inserted into the hitch collar, wherein the collar insertion member is attached to the hitch collar, and wherein the collar insertion member is encircled by the hitch collar and is encircled by the support arm; and
   wherein the support arm has a first end and a second end, and wherein the hitch collar hole is located proximate the first end of the support arm at a location along the longitudinal axis of the support arm that does not overlap the primary swing arm when the primary swing arm is oriented with the longitudinal axis of the primary swing arm substantially parallel to the longitudinal axis of the support arm, to provide space between the collar insertion member and the primary swing arm when the primary swing arm is oriented with the longitudinal axis of the primary swing arm substantially parallel to the longitudinal axis of the support arm.

2. The apparatus of claim 1:
   wherein the support arm has a first set screw hole; and
   further comprising a first set screw attached to the first set screw hole.

3. The apparatus of claim 1, wherein the hitch collar hole defines a hitch collar hole longitudinal axis, and wherein the hitch collar hole longitudinal axis is substantially perpendicular to the support arm longitudinal axis.

4. The apparatus of claim 1, wherein the hitch collar hole is rectangular.

5. The apparatus of claim 1, wherein a length of the support arm parallel to the support arm longitudinal axis is greater than a length of the primary swing arm parallel to the primary swing arm longitudinal axis.

6. The apparatus of claim 1, further comprising:
   a ground support post attached to the primary swing arm; and
   a base attached to the ground support post.

7. The apparatus of claim 1, further comprising a pedestal attached to the primary swing arm.

8. The apparatus of claim 1, wherein the device is a cooking device.

9. The apparatus of claim 1, wherein the device is a bicycle.

10. The apparatus of claim 1, wherein the device is a ski.

11. The apparatus of claim 1, wherein the device is luggage.

12. The apparatus of claim 1, wherein the device is a wheelchair.

13. The apparatus of claim 1, wherein the device is a container.

14. The apparatus of claim 1, wherein the device is a tank.

15. The apparatus of claim 1:
wherein the support arm has a support arm primary angle securing hole, and wherein the primary hinge assembly has a plurality of locking holes for selective alignment with the support arm angle securing hole; and
further comprising a primary angle locking bar inserted into one of the plurality of locking holes in the primary hinge assembly and into the primary angle securing hole in the support arm, to lock the longitudinal axis of the primary swing arm at an angle in relation to the longitudinal axis of the support arm selected from a plurality of angles determined by the locations of the plurality of locking holes in the primary hinge assembly and by the location of the primary angle securing hole in the support arm.

16. The apparatus of claim 15,
wherein the support arm has a back side;
wherein the hitch collar has a portion that protrudes from the back side of the support arm; and
wherein the collar insertion member is attached to the portion of the hitch collar that protrudes from the back side of the support arm.

17. The apparatus of claim 16, wherein the collar insertion member has a side having a first hole and a second hole.

18. The apparatus of claim 1, further comprising:
a ground support post hinge attached to the primary swing arm; and
a ground support post attached to the ground support post hinge.

19. The apparatus of claim 18, further comprising:
a base attached to an end of the ground support post; and
a ground support post retaining clip attached to the primary swing arm.

20. The apparatus of claim 1, wherein the support arm comprises a support arm top having a primary support arm top primary hinge hole, and a support arm bottom having a primary support arm bottom primary hinge hole aligned with the support arm top primary hinge hole.

21. The apparatus of claim 20, wherein the primary hinge assembly comprises:
a top hinge plate having a central hole for alignment with the support arm top primary hinge hole;
a bottom hinge plate having a central hole for alignment with the support arm bottom primary hinge hole; and
an attachment wall connected to the top hinge plate and the bottom hinge plate, and wherein the attachment wall is attached to the primary swing arm;
and wherein the apparatus further comprises a primary hinge bar inserted through the central hole in the top hinge plate in the primary hinge assembly, the support arm top primary hinge hole, the support arm bottom primary hinge hole, and the central hole in the bottom hinge plate of the primary hinge assembly, to attach the primary swing arm to the support arm, and to permit the swing arm to rotate in relation to the support arm.

22. The apparatus of claim 1, further comprising:
a pedestal having a base, wherein the base of the pedestal is attached to the primary swing arm; and
a column, wherein the column is at least partially inserted into the pedestal.

23. The apparatus of claim 22, wherein the device is coupled to the column.

24. The apparatus of claim 22,
wherein the hitch collar extends beyond the support arm in opposite directions along the longitudinal axis of the hitch collar hole; and
wherein the collar insertion member extends beyond the hitch collar in opposite directions along the longitudinal axis of the hitch collar hole.

25. The apparatus of claim 1,
wherein the support arm has a back side;
wherein the hitch collar has a portion that protrudes from the back side of the support arm; and
wherein the collar insertion member is attached to the portion of the hitch collar that protrudes from the back side of the support arm.

26. The apparatus of claim 25:
wherein the support arm has a first set screw hole, and further comprising:
a first set screw attached to the first set screw hole; and
wherein the first set screw is in contact with the collar insertion member to secure the collar insertion member to the hitch collar.

27. The apparatus of claim 26, wherein the collar insertion member includes a hitch ball.

28. The apparatus of claim 26:
wherein the hitch collar has a second set screw hole;
and further comprising:
a second set screw attached to the second set screw hole; and
wherein the first set screw and the second set screw are in contact with the collar insertion member to secure the collar insertion member to the hitch collar.

29. An apparatus selectively attachable to a vehicle, for transporting a device and positioning the device in an orientation that permits access to the vehicle, the apparatus comprising:
a support arm defining a support arm longitudinal axis, wherein the support arm has a hitch collar hole;
a hitch collar inserted into the hitch collar hole and attached to the support arm, wherein the hitch collar has a first set screw hole;
a first set screw attached to the first set screw hole;
a primary swing arm defining a primary swing arm longitudinal axis;
a primary hinge assembly coupled to the support arm and the primary swing arm;
a collar insertion member inserted into the hitch collar, wherein the collar insertion member is attached to the hitch collar, and wherein the collar insertion member is encircled by the hitch collar and is encircled by the support arm; and
wherein the support arm has a first end and a second end, and wherein the hitch collar hole is located proximate the first end of the support arm at a location along the longitudinal axis of the support arm that does not overlap the primary swing arm when the primary swing arm is oriented with the longitudinal axis of the primary swing arm substantially parallel to the longitudinal axis of the support arm, to provide space between the collar insertion member and the primary swing arm when the primary swing arm is oriented with the longitudinal axis of the primary swing arm substantially parallel to the longitudinal axis of the support arm.

30. The apparatus of claim 29, wherein the support arm has a second set screw hole;
and further comprising a second set screw attached to the second set screw hole.

31. The apparatus of claim 29, further comprising:
a ground support post hinge attached to the primary swing arm; and
a ground support post attached to the ground support post hinge.

32. The apparatus of claim 29:
wherein the support arm has a support arm primary angle securing hole, and wherein the primary hinge assembly has a plurality of locking holes for selective alignment with the support arm angle securing hole; and
further comprising a primary angle locking bar inserted into one of the plurality of locking holes in the primary hinge assembly and into the primary angle securing hole in the support arm, to lock the longitudinal axis of the primary swing arm at an angle in relation to the longitudinal axis of the support arm selected from a plurality of angles determined by the locations of the plurality of locking holes in the primary hinge assembly and by the location of the primary angle securing hole in the support arm.

33. A swingable apparatus selectively attachable to a vehicle, the apparatus comprising:
a support arm defining a support arm longitudinal axis, wherein the support arm has a hitch collar hole and a support arm primary angle securing hole;
a primary swing arm defining a primary swing arm longitudinal axis;
a primary hinge assembly coupled to the support arm and the primary swing arm, wherein the primary hinge assembly has a plurality of locking holes for selective alignment with the support arm angle securing hole;
a primary angle locking bar inserted into one of the plurality of locking holes in the primary hinge assembly and into the primary angle securing hole in the support arm, to lock the longitudinal axis of the primary swing arm at an angle in relation to the longitudinal axis of the support arm selected from a plurality of angles determined by the locations of the plurality of locking holes in the primary hinge assembly and by the location of the primary angle securing hole in the support arm;
a hitch collar inserted into the hitch collar hole in the support arm and attached to the support arm;
a collar insertion member inserted into the hitch collar, wherein the collar insertion member is attached to the hitch collar, and wherein the collar insertion member is encircled by the hitch collar and is encircled by the support arm; and
wherein the support arm has a first end and a second end, and wherein the hitch collar hole is located proximate the first end of the support arm at a location along the longitudinal axis of the support arm that does not overlap the primary swing arm when the primary swing arm is oriented with the longitudinal axis of the primary swing arm substantially parallel to the longitudinal axis of the support arm, to provide space between the collar insertion member and the primary swing arm when the primary swing arm is oriented with the longitudinal axis of the primary swing arm substantially parallel to the longitudinal axis of the support arm.

34. The apparatus of claim 33, further comprising:
a ground support post hinge attached to the primary swing arm; and
a ground support post attached to the ground support post hinge.

35. The apparatus of claim 33,
wherein the support arm has a back side;
wherein the hitch collar has a portion that protrudes from the back side of the support arm; and
wherein the collar insertion member is attached to the portion of the hitch collar that protrudes from the back side of the support arm.

36. The apparatus of claim 35:
wherein the support arm has a first set screw hole; and
further comprising a first set screw attached to the first set screw hole.

37. An apparatus selectively attachable to a vehicle, for transporting a cooking device and positioning the cooking device in an orientation for cooking that permits access to the vehicle, the apparatus comprising:
a support arm defining a support arm longitudinal axis, wherein the support arm has a support arm primary angle securing hole;
a primary swing arm defining a primary swing arm longitudinal axis;
a primary hinge assembly coupled to the support arm and the primary swing arm, wherein the primary hinge assembly has a plurality of locking holes for selective alignment with the support arm angle securing hole;
a primary angle locking bar inserted into one of the plurality of locking holes in the primary hinge assembly and into the primary angle securing hole in the support arm, to lock the longitudinal axis of the primary swing arm at an angle in relation to the longitudinal axis of the support arm selected from a plurality of angles determined by the locations of the plurality of locking holes in the primary hinge assembly and by the location of the primary angle securing hole in the support arm;
a ground support post attached to the primary swing arm;
a base attached to the ground support post;
wherein the support arm has a hitch collar hole;
a hitch collar inserted into the hitch collar hole in the support arm and attached to the support arm;
a collar insertion member inserted into the hitch collar, wherein the collar insertion member is attached to the hitch collar, and wherein the collar insertion member is encircled by the hitch collar and is encircled by the support arm; and
wherein the support arm has a first end and a second end, and wherein the hitch collar hole is located proximate the first end of the support arm at a location along the longitudinal axis of the support arm that does not overlap the primary swing arm when the primary swing arm is oriented with the longitudinal axis of the primary swing arm substantially parallel to the longitudinal axis of the support arm, to provide space between the collar insertion member and the primary swing arm when the primary swing arm is oriented with the longitudinal axis of the primary swing arm substantially parallel to the longitudinal axis of the support arm.

38. The apparatus of claim 37, further comprising a pedestal having a base, wherein the base of the pedestal is attached to the primary swing arm.

39. The apparatus of claim 38, further comprising a column, wherein the column is at least partially inserted into the pedestal.

40. An apparatus selectively attachable to a vehicle, for transporting a cooking device and positioning the cooking device in an orientation for cooking that permits access to the vehicle, the apparatus comprising:

a support arm having a support arm top and a support arm bottom, and wherein the support arm defines a support arm longitudinal axis, and wherein the support arm top has a support arm top primary hinge hole and the support arm bottom has a support arm bottom primary hinge hole aligned with the support arm top primary hinge hole;

a primary swing arm defining a primary swing arm longitudinal axis;

a primary hinge assembly comprising:
 a top hinge plate having a central hole for alignment with the support arm top primary hinge hole;
 a bottom hinge plate having a central hole for alignment with the support arm bottom primary hinge hole; and
 an attachment wall connected to the top hinge plate and the bottom hinge plate, the attachment wall being attached to the primary swing arm;

a primary hinge bar inserted through the central hole in the top hinge plate in the primary hinge assembly, the support arm top primary hinge hole, the support arm bottom primary hinge hole, and the central hole in the bottom hinge plate of the primary hinge assembly, to attach the primary swing arm to the support arm, and to permit the swing arm to rotate in relation to the support arm;

wherein the support arm has a hitch collar hole;

a hitch collar inserted into the hitch collar hole in the support arm and attached to the support arm;

a collar insertion member inserted into the hitch collar, wherein the collar insertion member is attached to the hitch collar, and wherein the collar insertion member is encircled by the hitch collar and is encircled by the support arm; and wherein the support arm has a first end and a second end, and wherein the hitch collar hole is located proximate the first end of the support arm at a location along the longitudinal axis of the support arm that does not overlap the primary swing arm when the primary swing arm is oriented with the longitudinal axis of the primary swing arm substantially parallel to the longitudinal axis of the support arm, to provide space between the collar insertion member and the primary swing arm when the primary swing arm is oriented with the longitudinal axis of the primary swing arm substantially parallel to the longitudinal axis of the support arm.

41. The apparatus of claim 40, further comprising:
 a ground support post hinge attached to the primary swing arm; and
 a ground support post attached to the ground support post hinge.

42. An apparatus selectively attachable to a vehicle, for transporting a cooking device and positioning the cooking device in an orientation for cooking that permits access to the vehicle, the apparatus comprising:
 a support arm defining a support arm longitudinal axis;
 a primary swing arm defining a primary swing arm longitudinal axis;
 a primary hinge assembly coupled to the support arm and the primary swing arm;
 a pedestal having a base, wherein the base of the pedestal is attached to the primary swing arm;
 a column, wherein the column is at least partially inserted into the pedestal;
 wherein the support arm has a hitch collar hole;
 a hitch collar inserted into the hitch collar hole in the support arm and attached to the support arm;
 a collar insertion member inserted into the hitch collar, wherein the collar insertion member is attached to the hitch collar, and wherein the collar insertion member is encircled by the hitch collar and is encircled by the support arm; and
 wherein the support arm has a first end and a second end, and wherein the hitch collar hole is located proximate the first end of the support arm at a location along the longitudinal axis of the support arm that does not overlap the primary swing arm when the primary swing arm is oriented with the longitudinal axis of the primary swing arm substantially parallel to the longitudinal axis of the support arm, to provide space between the collar insertion member and the primary swing arm when the primary swing arm is oriented with the longitudinal axis of the primary swing arm substantially parallel to the longitudinal axis of the support arm.

43. An apparatus selectively attachable to a vehicle, the apparatus comprising:
 a support arm having a support arm longitudinal axis;
 means for selectively attaching the support arm to the vehicle;
 means for positioning the support arm at a desired distance from the vehicle;
 a primary swing arm having a primary swing arm longitudinal axis;
 means for swingably attaching the primary swing arm to the support arm;
 means for securing the primary swing arm with the longitudinal axis of the primary swing arm at an angle selected from a plurality of angles, in relation to the longitudinal axis of the support arm;
 wherein the support arm has a hitch collar hole;
 a hitch collar inserted into the hitch collar hole in the support arm and attached to the support arm;
 a collar insertion member inserted into the hitch collar, wherein the collar insertion member is attached to the hitch collar, and wherein the collar insertion member is encircled by the hitch collar and is encircled by the support arm; and
 wherein the support arm has a first end and a second end, and wherein the hitch collar hole is located proximate the first end of the support arm at a location along the longitudinal axis of the support arm that does not overlap the primary swing arm when the primary swing arm is oriented with the longitudinal axis of the primary swing arm substantially parallel to the longitudinal axis of the support arm, to provide space between the collar insertion member and the primary swing arm when the primary swing arm is oriented with the longitudinal axis of the primary swing arm substantially parallel to the longitudinal axis of the support arm.

44. The apparatus of claim 43,
 wherein the support arm has a back side;
 wherein the hitch collar has a portion that protrudes from the back side of the support arm; and
 wherein the collar insertion member is attached to the portion of the hitch collar that protrudes from the back side of the support arm.

45. The apparatus of claim 44,
 wherein the hitch collar extends beyond the support arm in opposite directions along the longitudinal axis of the hitch collar hole; and
 wherein the collar insertion member extends beyond the hitch collar in opposite directions along the longitudinal axis of the hitch collar hole.

46. The apparatus of claim 45, wherein the hitch collar hole defines a hitch collar hole longitudinal axis, and wherein the hitch collar hole longitudinal axis is substantially perpendicular to the support arm longitudinal axis.

47. The apparatus of claim 46, wherein the collar insertion member includes a hitch ball.

48. An apparatus selectively attachable to a vehicle, for transporting a device and for positioning the device in an orientation that facilitates access to the vehicle, the apparatus comprising:
   a support arm defining a support arm longitudinal axis;
   a primary swing arm defining a primary swing arm longitudinal axis;
   a primary hinge assembly coupled to the support arm and the primary swing arm;
   the device, wherein the device is coupled to the primary swing arm;
   wherein the support arm has a hitch collar hole;
   a hitch collar inserted into the hitch collar hole in the support arm and attached to the support arm;
   a collar insertion member inserted into the hitch collar, wherein the collar insertion member is attached to the hitch collar, and wherein the collar insertion member is encircled by the hitch collar and is encircled by the support arm; and
   wherein the support arm has a first end and a second end, and wherein the hitch collar hole is located proximate the first end of the support arm at a location along the longitudinal axis of the support arm that does not overlap the primary swing arm when the primary swing arm is oriented with the longitudinal axis of the primary swing arm substantially parallel to the longitudinal axis of the support arm, to provide space between the collar insertion member and the primary swing arm when the primary swing arm is oriented with the longitudinal axis of the primary swing arm substantially parallel to the longitudinal axis of the support arm.

49. The apparatus of claim 48, wherein the device is a cooking device.

50. The apparatus of claim 48, wherein the device is rotatably coupled to the primary swing arm.

51. An apparatus selectively attachable to a vehicle, for transporting a cooking device and for positioning the cooking device in a location that facilitates access to the vehicle, the apparatus comprising:
   a support arm defining a support arm longitudinal axis;
   a primary swing arm defining a primary swing arm longitudinal axis;
   a hinge bar shaped and configured to rotatably couple the primary swing arm with the support arm;
   the cooking device, wherein the cooking device is coupled to the primary swing arm;
   means for securing the support arm at a desired distance from the vehicle;
   wherein the support arm has a hitch collar hole;
   a hitch collar inserted into the hitch collar hole in the support arm and attached to the support arm;
   a collar insertion member inserted into the hitch collar, wherein the collar insertion member is attached to the hitch collar, and wherein the collar insertion member is encircled by the hitch collar and is encircled by the support arm; and
   wherein the support arm has a first end and a second end, and wherein the hitch collar hole is located proximate the first end of the support arm at a location along the longitudinal axis of the support arm that does not overlap the primary swing arm when the primary swing arm is oriented with the longitudinal axis of the primary swing arm substantially parallel to the longitudinal axis of the support arm, to provide space between the collar insertion member and the primary swing arm when the primary swing arm is oriented with the longitudinal axis of the primary swing arm substantially parallel to the longitudinal axis of the support arm.

52. The apparatus of claim 51, further comprising a column coupled to the primary swing arm and the cooking device, wherein the column is shaped and configured to permit rotation of the cooking device in relation to the primary swing arm.

53. An apparatus selectively attachable to a vehicle, for transporting a device and for positioning the device in a location that facilitates access to the vehicle, the apparatus comprising:
   a support arm defining a support arm longitudinal axis, and wherein the support arm defines a hitch collar hole;
   a primary swing arm defining a primary swing arm longitudinal axis;
   a hinge bar shaped and configured to rotatably couple the primary swing arm to the support arm;
   the device, wherein the device is coupled to the primary swing arm;
   means for securing the support arm at a desired distance from the vehicle;
   a hitch collar inserted into the hitch collar hole in the support arm and attached to the support arm;
   a collar insertion member inserted into the hitch collar, wherein the collar insertion member is attached to the hitch collar, and wherein the collar insertion member is encircled by the hitch collar and is encircled by the support arm; and
   wherein the support arm has a first end and a second end, and wherein the hitch collar hole is located proximate the first end of the support arm at a location along the longitudinal axis of the support arm that does not overlap the primary swing arm when the primary swing arm is oriented with the longitudinal axis of the primary swing arm substantially parallel to the longitudinal axis of the support arm, to provide space between the collar insertion member and the primary swing arm when the primary swing arm is oriented with the longitudinal axis of the primary swing arm substantially parallel to the longitudinal axis of the support arm.

* * * * *